US006094529A

United States Patent [19]
Jeffries et al.

[11] Patent Number: 6,094,529
[45] Date of Patent: Jul. 25, 2000

[54] METHOD, APPARATUS AND COMPUTER PROGRAM PRODUCT FOR LINKING STACK MESSAGES TO RELEVANT INFORMATION

[76] Inventors: Robin Jeffries, 2569 Webster St., Palo Alto, Calif. 94301; David Weatherford, 2320 Jewell Pl., Mountain View, Calif. 94043; Evan Adams, 643 Estudillo Ave., San Leandro, Calif. 94577

[21] Appl. No.: 08/768,695

[22] Filed: Dec. 18, 1996

Related U.S. Application Data

[63] Continuation-in-part of application No. 08/530,595, Sep. 19, 1995.
[51] Int. Cl.[7] .................................................. G06F 9/45
[52] U.S. Cl. ..................... 395/704; 395/183.14; 345/335
[58] Field of Search ............................... 395/704, 183.14, 395/336, 337, 338, 335; 345/335, 336, 337, 338; 707/507, 513

[56] References Cited

U.S. PATENT DOCUMENTS 5,581,684  12/1996  Dudzik et al. ........................... 345/338

*Primary Examiner*—James P. Trammell
*Assistant Examiner*—Demetra R. Smith
*Attorney, Agent, or Firm*—Robert P. Sabath

[57] ABSTRACT

Methods, apparatus, and computer program products for linking stack messages to information relevant to stack entries and for generating the stack messages by adding link information to the stack messages. The stack messages are displayed to the user without the link information. Portions of the visible stack messages pertaining to the link information are highlighted, and upon selection by the user of the highlighted portion of the stack message, information relevant to the highlighted stack message is automatically displayed, for example, by running an editor, loading the source file corresponding to the message, and displaying the relevant portion of a source file.

6 Claims, 16 Drawing Sheets

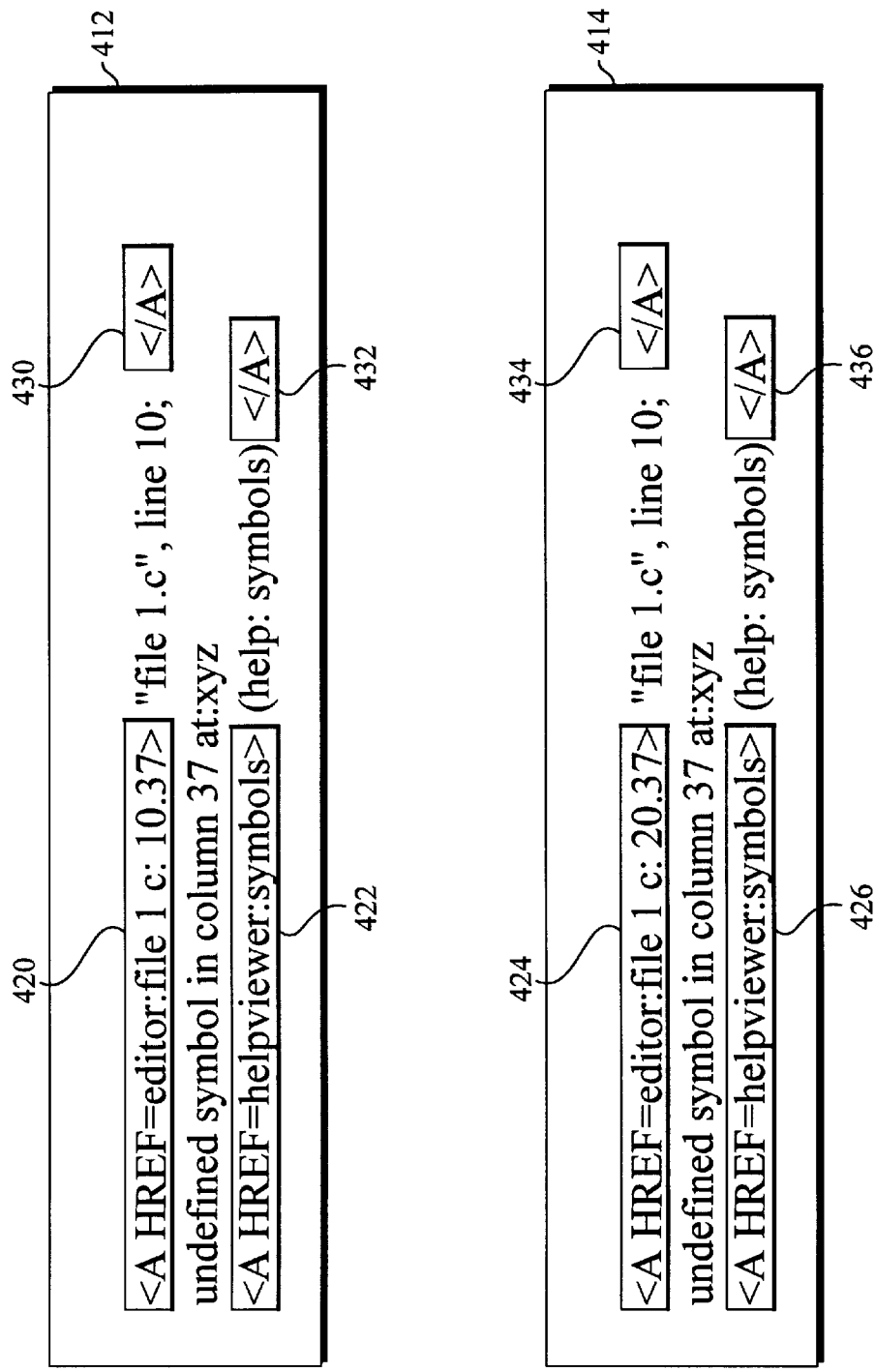

```
<HTML>
<head>
<title> Stack Window </title>
</head>
<body>
<h2> Stack contents </h2>
<ul>
<li><A HREF = editor : print. c : 3.1>print </A> (
    <A HREF = data : print. c : print : arg.1 >char* </A>)
<li><A HREF = editor : print. c : 16.1>| (
    <A HREF = data : main..c : print upper : arg.1 >char* </A>)
<li><A HREF = editor : main. c : 6.1>| (
    <A HREF = data : main. c : main : arg.1 >int </A>)
    <A HREF = data : main. c : main : arg.2 >char** </A>)
</ul>
</body>
</HTML>
```

FIG. 14

METHOD, APPARATUS AND COMPUTER PROGRAM PRODUCT FOR LINKING STACK MESSAGES TO RELEVANT INFORMATION

RELATED APPLICATIONS

This is a continuation-in-part of patent application Ser. No. 08/530,595, entitled "Method and Apparatus for Linking Compiler Error Messages to Relevant Information" filed Sep. 19, 1995, by Achut P. Reddy, Daniel J. O'Leary, Robert B. Jervis, Robin Jeffries and Evan W. Adams, which is incorporated by reference in its entirety.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to a system for debugging a computer program and more particularly to a system for correcting errors in a computer program by special flags linking displayed stack entries to information corresponding to the displayed stack entries.

BACKGROUND OF THE INVENTION

Conventional compilers translate source code into object code for execution by a computer. Many conventional compilers are implemented as software on a conventional computer system, such as the Turbo C++ compiler commercially available from Borland International of Scotts Valley, Calif. running under the MS-DOS operating system commercially available from Microsoft Corporation of Redmond, Wash.

As shown in FIG. 1, a conventional computer system includes a processor 101 coupled to a first storage device 112 such as a memory, and a second storage device 114 such as a disk storage system. A user may interact with the system via a keyboard 116, mouse 118 and a monitor 120. Computer program product reader 107, such as a memory, hard drive, floppy disk drive or CD-ROM drive can is coupled to processor 101 to allow computer readable program code devices 97 such as encoded bits of a computer program product 99 such as a memory, hard disk, floppy disk, CD-ROM or other storage device to be input to processor 101 and stored in memory 108 and/or disk storage 103 for use in controlling the operation of the computer system 109 when computer program product 99 is inserted into slot 98 of computer program product reader 107. An operating system is loaded into memory 108 or disk storage 103 or a combination of memory 108 and disk storage 103 and instructs processor 101 to load and execute compilers or other applications described below. Many conventional compilers or other applications are distributed on computer program products 99, such as diskettes, storage devices such as ROMs or storage devices such as disk storage system 114, each containing computer readable code devices 97 which cause the computer system 109 operate in a particular manner such as is described herein when a copy of the code devices is loaded into the computer system 109.

Many compilers also detect the presence of errors in the source code. Some conventional compilers provide a listing of all errors in the source code to allow the programmer to see many errors simultaneously. FIG. 2 shows the output of one such conventional compiler. Error messages 212, 214 are located in a build output window 210 of the compiler, although other compilers utilize other output display methods. Error messages 212, 214 each instruct the user that a symbol was undefined. This capability allows the programmer to locate and correct several errors simultaneously. For example by defining one symbol, errors corresponding to error messages 212 and 214 may be simultaneously corrected. Thus, similar or related errors may be easily corrected. However, to correct each error, the source code location for each error must be identified to allow the user to view the error. If the meaning or cause of the error 4 is not apparent, the user may have to search information using a help facility. Some compilers assist the use in this process by providing information such as the file name and source code line number to allow the user to locate the error using an editor, or by suggesting a search topic to use to locate the relevant information in the help facility. Error messages 212, 214 provide the file name, line number and search topic for each error. The user may have to start the source code file editor or help facility, and then manually locate the line or topic.

Some compilers, such as the conventional Delphi Pascal compiler commercially available from Borland International of Scotts Valley, Calif. locate errors sequentially, one error at a time. Rather than displaying a large number of errors simultaneously, these compilers utilize an integrated editor to display a portion of the source code containing the first sequential error, highlight the source code line containing the error and display an error explanation at the bottom of the screen. The user corrects one error and directs the compiler to recompile the source code, which recompiles or continues compiling at the location of the corrected error until the next source code error is reached or the compiler completes the compilation successfully.

Both types of editors require the programmer to utilize a separate help facility to locate help information relevant to each error. This makes the process of correcting more difficult errors for which help is required more cumbersome, because the user must run the help facility and locate the most relevant help information.

A stack is stored into memory 108 or disk storage 103 or a combination of both. The processor 101 uses the stack to remember the addresses of programs or instructions that it has executed and local arguments used to invoke a subroutine. When it executes a subroutine, the processor 102 reads the stack to send the arguments for the subroutine. After executing the subroutine, the processor 102 reads the stack to determine the return address in the program invoking the subroutine.

The stack provides the control flow of a program that is used by programmers for debugging the program. However, as configured, the stack insufficiently describes the control flow for the programmer. The stack typically is mapped onto a view of the source code for the program. Most debuggers provide a separate command that allows the programmer to view the source code associated with a particular stack frame.

This type of debugger requires the programmer to select a separate command to display the source code corresponding to the stack frame. This makes the process of debugging errors for which reviewing the stack frame is required more cumbersome, because the user must select the separate command and locate the relevant source code.

SUMMARY OF THE INVENTION

The present invention displays the stack contents that are linked to other information, such as the source code related to the stack frame or the location of additional relevant information. Certain fields in the displayed stack are highlighted, and the user may select the highlighted field using an input device such as a mouse. Upon selection of a field, a program may be executed to load the relevant information and to display information relevant to the user selected stack frame.

Such a capability provides the benefits of the display of the stack contents with the ease of use of automatic source code display and location in response to simple user selection commands and without requiring a user to search source code of stack frames that were not selected.

A BRIEF DESCRIPTION OF THE DRAWINGS

FIG. 4 is a pictorial illustration showing both hidden and visible text in a completed error message according to an embodiment of the present invention.

FIG. 14 is a pictorial illustration showing both hidden and visible text in a stack according to another embodiment of the present invention.

DETAILED DESCRIPTION OF A PREFERRED EMBODIMENT

Figure 1:
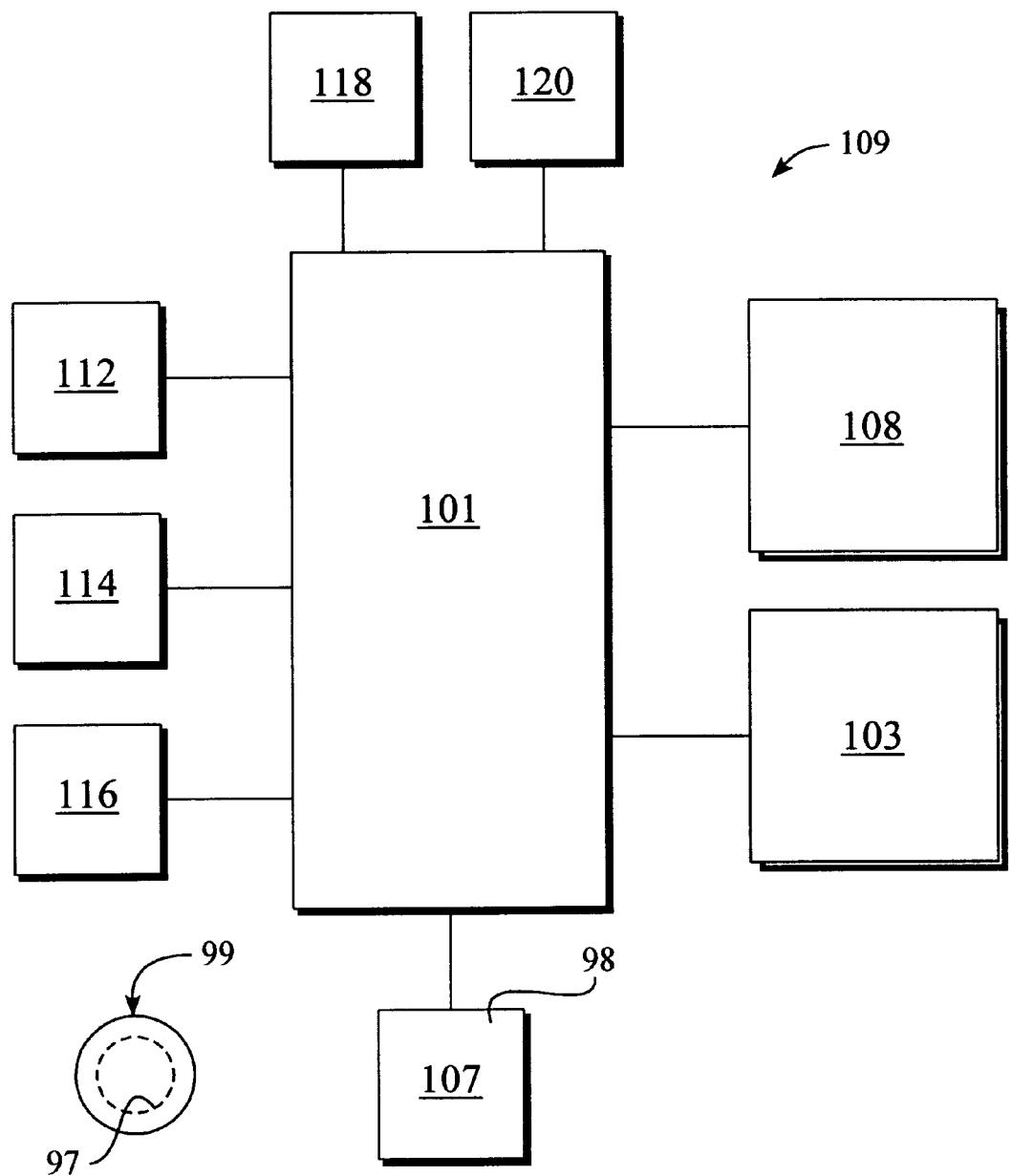
FIG. 1 is a block schematic diagram of a conventional computer system.
Figure 2:
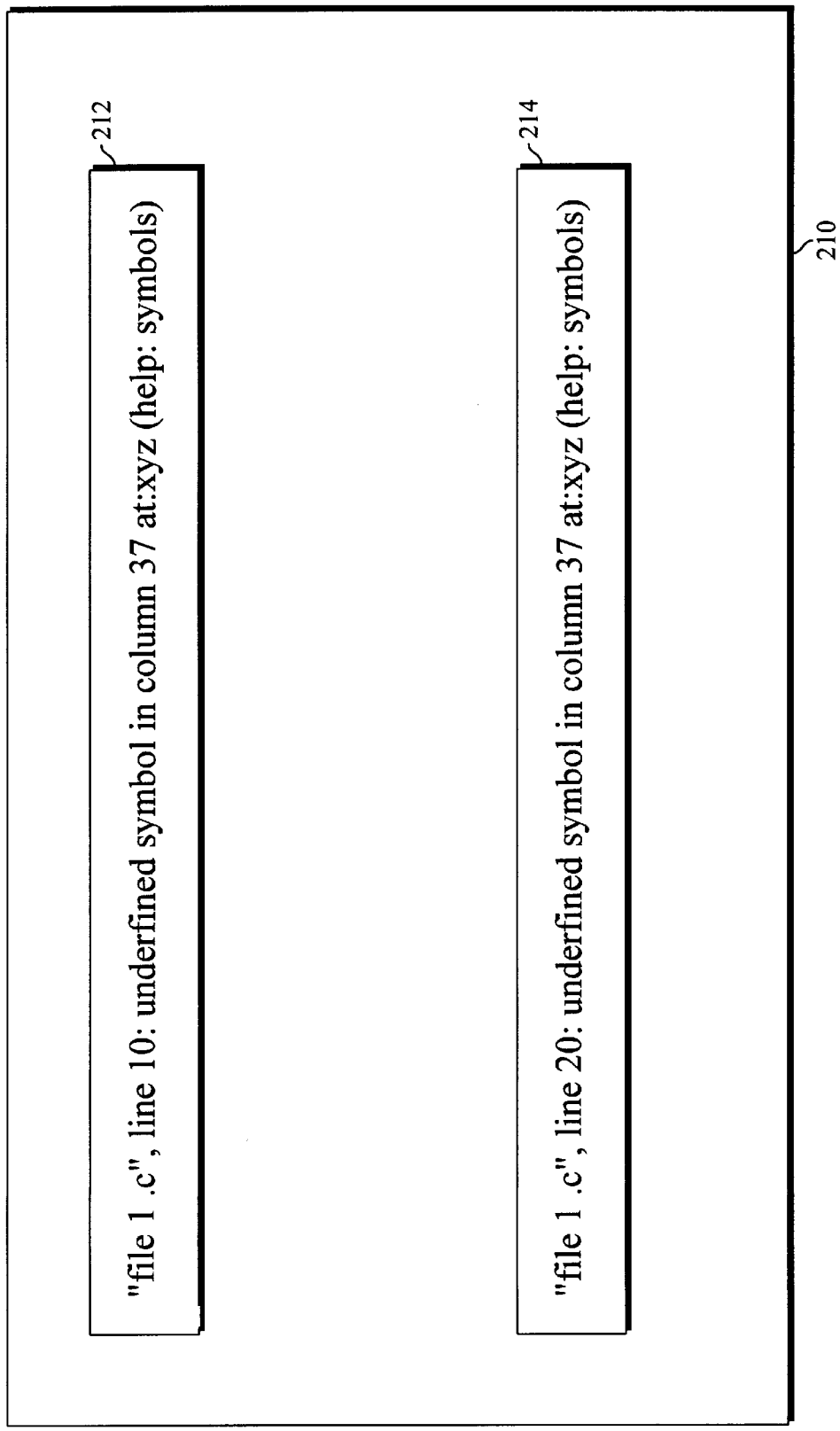
FIG. 2 is a pictorial illustration of an error code display screen of a conventional compiler.

Referring now to FIGS. 1, 2, 3A, 4 and 5, one embodiment of a system 308 for linking compiler-generated error messages with relevant portions of a source code listing and help information is shown. In one embodiment, system 308 is implemented in software and distributed on a computer program product to operate on a conventional computer system such as the computer system 109 shown in FIG. 1. Conventional compiler 310 accepts source files at its input 312 and generates error messages such as the error messages 212, 214 at its output 314.

In one embodiment, filter 320 accepts at its input 322 the error messages from, the output 314 of compiler 310. Scanner 324 scans the error messages to identify the source file and position within the source file of the error, as well as other information relevant to the error. In one embodiment, scanner 324 scans the error message 212, 214 and identifies the file as File1.c by selecting the text in the quotation marks, the line number of the error equal to 10 by selecting the text following the word 'line', and the column number of the error equal to 37 by selecting the text following the word column. Scanner also locates and selects any text within parentheses.

Markup text assembler 326 adds text to be used by the link manager 330 described below from text selected by the scanner 324 described above. In one embodiment, the markup text assembler 336 adds text in the form of hypertext markup language commands, or HTML commands. HTML commands are described in Ray Duncan, *An HTML Primer*, PC Magazine, Jun. 13, 1995 at 261 et. seq. in one embodiment, markup text assembler assembles markup commands corresponding to the selected text. The filename, column and line number selected by scanner 324 are assembled by markup text assembler 326 into markup reference 420.

The text within parentheses is parsed by the links manager 330 to determine the application and parameters to the application which will be used to link the application to the error message, as described below. In one embodiment, a lookup table 327 is used to match the portion of the text in error messages 212, 214 parentheses and before the colon to the application to be used to provide the designated information. In one embodiment the word, 'help' in error messages 212, 214 is matched to the 'help viewer' application, described below. Parameters to be used by the matched application follow the colon. Markup text assembler 326 builds the markup reference 422 by adding the application name from lookup table 327 to a colon and the parameters, if any. Each reference 420, 422, 424, 426 is completed by markup text assembler by adding the characters '<A HREF=' to the beginning of each markup reference 420, 422, 424, 426 and the character '>' to the end of each markup reference 420, 422, 424, 426.

Markup inserter 328 inserts the markup references in appropriate positions within the error messages 212, 214. In one embodiment, markup reference 420 corresponding to the source code file is inserted in front of the error message, and markup reference 422 corresponding to parenthetical statements are inserted prior to the first parenthesis. In one embodiment, markup inserter 328 also inserts the characters '</A>' 430, 432, 434, 436 after the colon following the original position of the line number, and after each closing parenthesis following a parenthetical message, for use as described below. The characters </A>operate as end-of-link identifiers 430, 432, 434, 436. Filter 320 sends the completed messages 412, 414 to the filter output 329.

In one embodiment, compiler 310 generates completed messages 412, 414 and thus filter 320 is necessary.

Figure 3A:
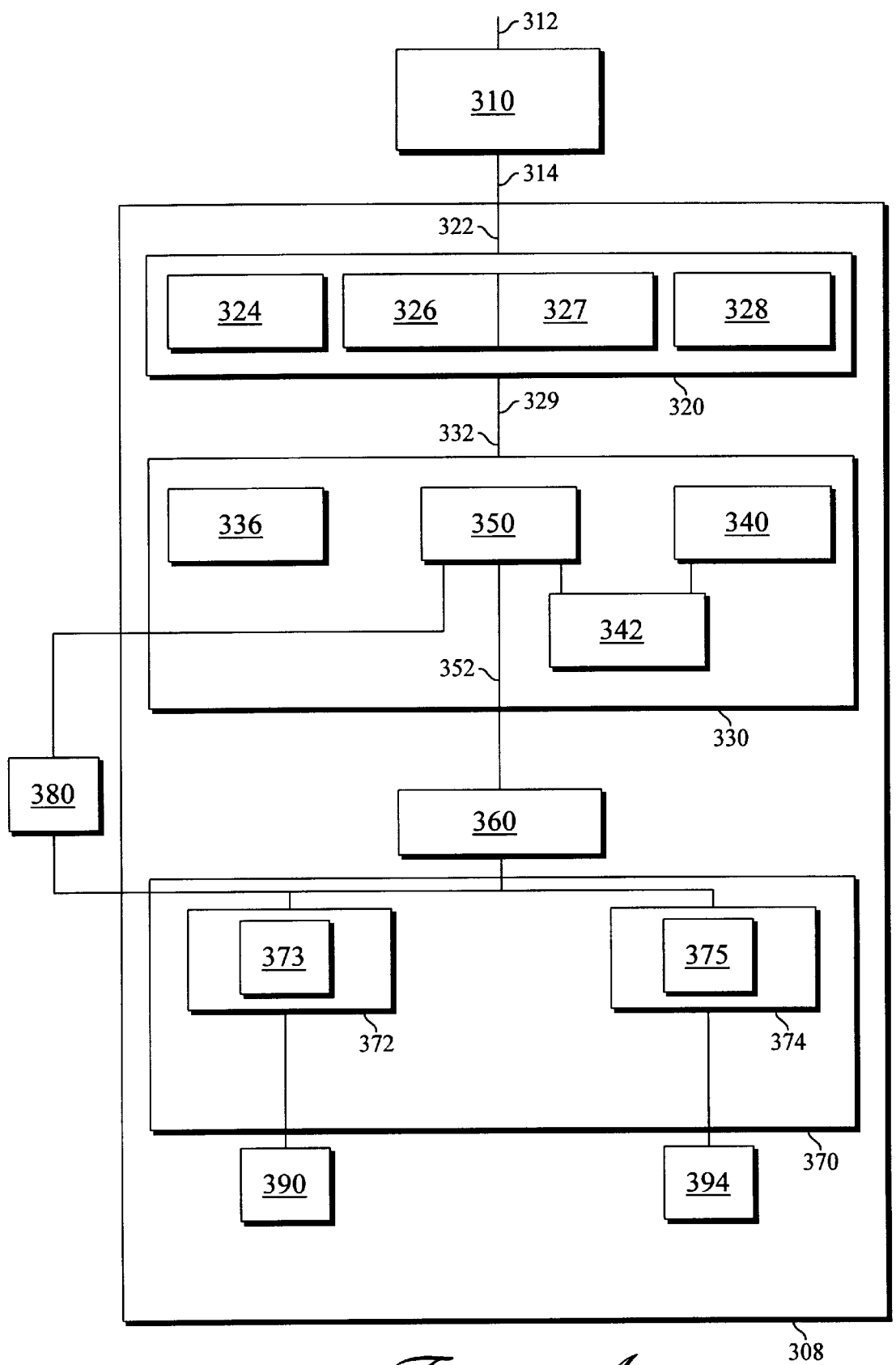
FIG. 3A is a block schematic diagram of an apparatus which relates relevant information to compiler error messages according to one embodiment of the present invention.
Figure 3B:
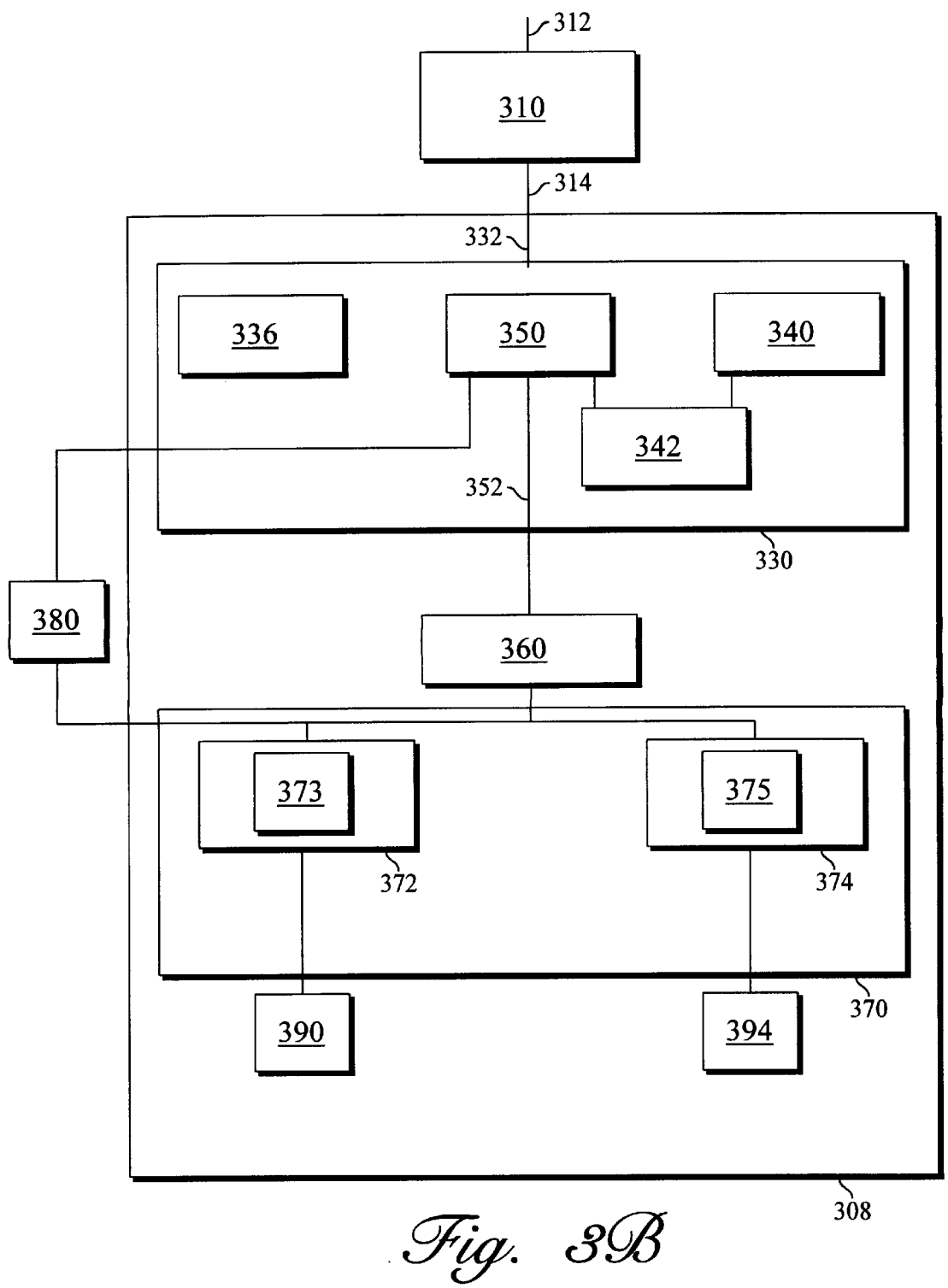
FIG. 3B is a block schematic diagram of an apparatus which relates relevant information to compiler error messages according to another embodiment of the present invention.

FIG. 3B illustrates this embodiment, and is similar to FIG. 3A except that the filter is not present and the compiler output 314 is coupled directly to the links manager 330, as described below.

Figure 5:
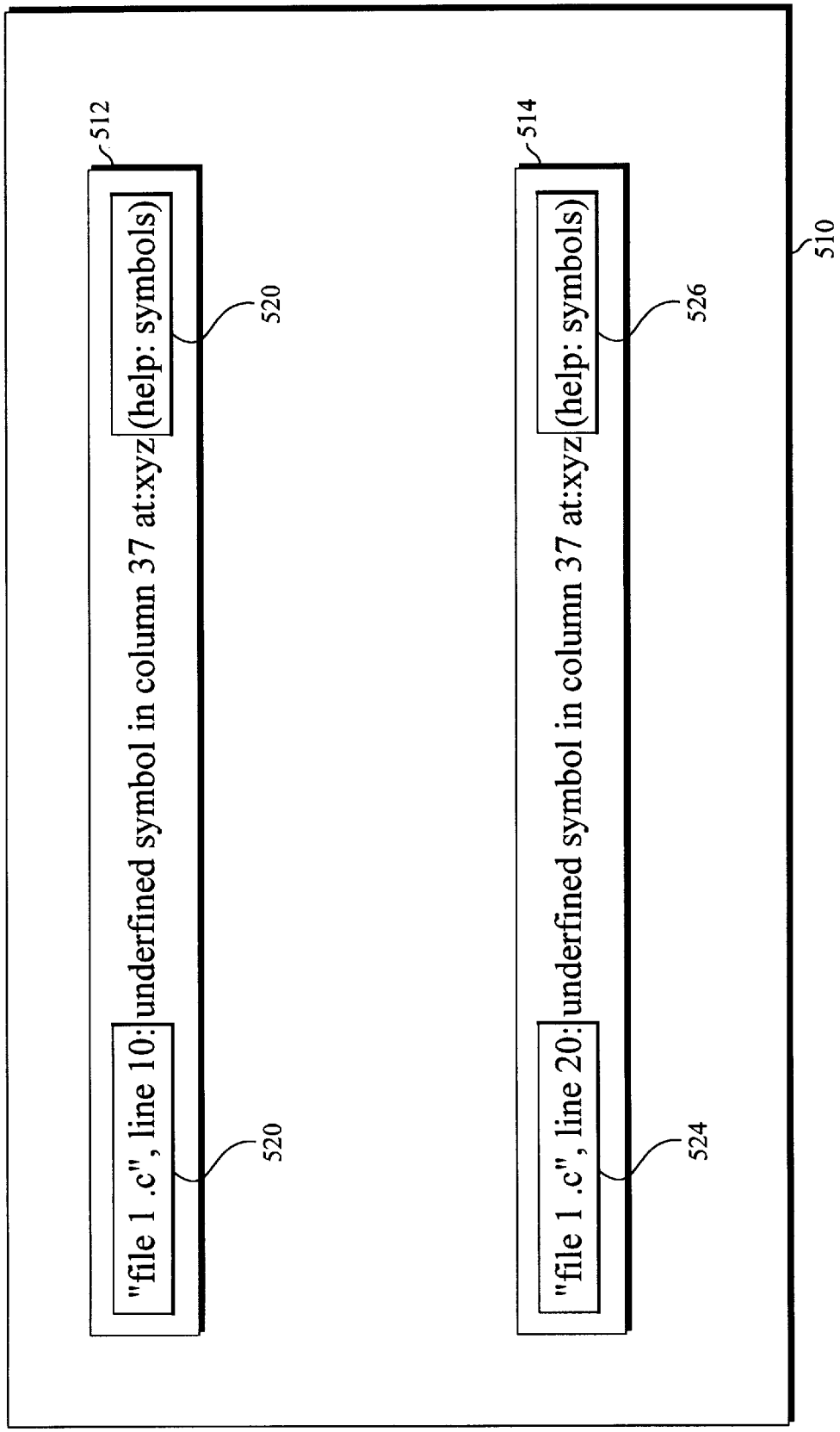
FIG. 5 is a pictorial illustration of a display screen showing visible and highlighted text of an error message display according to one embodiment of the present invention.

Referring now to FIGS. 2, 3A, 4 and 5, in one embodiment, filter output 329 is coupled to the input of links manager 330. Links manager 330 displays and allows the user to interact with links, or highlighted portions 520, 522, 524, 526 of the completed error messages 412, 414 which appear to the user similar to the original error messages 212, 214 with the addition of visual indicators such as highlighted portions 520, 522, 524, 526, or glyphs, which are small pictures. Links scanner 336 scans the text at the links manager input 332 and identifies any markup references 420, 422, 424, 426 and end-of-link identifiers 430, 432, 434, 436. In one embodiment, links renderer 340 displays the completed messages 412, 414 as a linked error message in which markup references 420, 422, 424, 426 are not displayed, and end-of-link identifiers 430, 432, 434, 436 are not displayed, and text 520, 522, 524, 526 between each markup reference 420, 422, 424, 426 and the following end-of-link identifier 430, 432, 434, 436 is highlighted in some fashion, such as by underlining, changing the background color, or both, as shown in FIG. 5. Additionally, or alternatively, a glyph may be displayed near the text 520, 522, 524, 526 to provide a visual indicator. The highlighted text 520, 522, 524, 526, the glyph or both are also known as links 520, 522, 524, 526, while the information pertaining to the link is known as link information 420, 422, 424, 426. The links renderer 340 also maintains a table of links positions 342 containing the screen coordinates of each link 520, 522, 524, 526. Links renderer 340 also displays a window 510 and allows the user to interact with the window 510 by responding to scrolling and other commands for the display of the error messages 512, 514 in the window 510.

Links activator 350 is coupled to receive mouse button and position messages from the operating system 380. When a mouse button down message is received by links activator 350, it identifies the location of the mouse using position messages from the operating system and determines if the mouse is positioned over a link 520, 522, 524, 526 using the table of links positions 342 described above.

If the user has pressed and released a mouse button while the mouse is positioned over a link 520, 522, 524, 526, the markup reference 420, 422, 424, 426 preceding the link 520, 522, 524, 526 is sent by links activator 350 via output 352 to address resolver 360 which separates the parameters of a multiple parameter markup reference such as the editor markup references 420, 424, determines the application 394 or editor 390 corresponding to the link and calls the module 372, 374 corresponding to the application or editor, sending the separated parameters as parameters to the modules 372, 374.

Each module 372, 374 in control manager 370 operates an application 394 or editor 390 based upon the link 520, 522, 524, 526 selected by the user s described above. In one embodiment, if address resolver 360 receives a markup reference 420, 424 corresponding to the line number of the compiler source file, address resolver 360 calls editor control module 372 to run the editor 390 if the editor 390 is not already running, load the source file if it is not already loaded, display the line number indicated in the markup reference 420, 424 and position the editor cursor at the column number indicated in the markup reference 420, 424 to the right of the period. Editor control module 372 assembles the proper commands and sends it to the operating system 380 to start the editor, or to the editor 390 to load the source file or position the cursor and display the desired line number. In one embodiment, the operating system 380 is the SPARCSystem operating system commercially available from Sun Microsystems, Inc. of Mountain View, Calif. and the operating system call to run the editor 390 execvp. In one embodiment, editor 390 is a conventional XEMACS editor, adapted as described below, and the commands to load a file and display a line number are eserve-load-file, and eserve-goto-lineno, respectively, implemented in XEMACS as described below. In one embodiment, the sequence listed in Appendix 1 is stored into a disk file in directory/home/user1/elisp, in the file ebo.el. The sequence is loaded into the conventional XEMACS editor to adapt it to perform the eserve-load-file, and eserve-goto-lineno commands using the following two XEMACS commands:

(setq load-path (append load-path '("/opt/SUNWspro/lib")))

(load "/home/user1/elisp/ebo.el")

In one embodiment, editor control module 372 maintains the status of the editor 390 in a status list 373 to allow for the determination of whether to start the editor or load the file based upon previous commands the editor control module 372 sent to the editor 390. If the editor 390 terminates without a command from the editor control module 372, editor control module 372 will update its status list 373 based upon operating system messages received when editor control module 372 next attempts to communicate with editor 390.

In one embodiment, if address resolver 360 receives a markup reference 422, 426 corresponding to the help viewer 394, address resolver 360 calls help control module 374 to run the help viewer 394 if not already running, and to display a portion of the help information indicated by the parameter sent from address resolver 360. Help control module 374 assembles and sends the command to the operating system 380 to load the help viewer 394 if necessary, and assembles and sends to the help viewer 394 the command to display the information as indicated by the parameter received from the address resolver 360, as described above. In one embodiment, the operating system 380 is the conventional Solaris™ operating system commercially available from Sun Microsystems, Inc., of Mountain View, Calif., the help viewer is a dynamically loaded shared library, such as libDtHelp.so contained in CDE 1.0 available from Sun Microsystems of Mountain View, Calif. and the command to load the help viewer 394 is dlopen("libDtHelp.so.1", RTLD_LAZY). In such an embodiment, subsequent commands used to direct the help viewer 394 to display help information are made using function calls to the shared library, such as the libDtHelp.so void function HelpOnTopic, containing the parameters "parent" of type Widget, containing a handle to the help control module 374 and "clientdata" containing a pointer to a text string containing the keyword from which to locate the help information. In help messages 512, 514 the keyword is located to the right of the colon in text 522, 526 and is "symbols".

Figure 6:
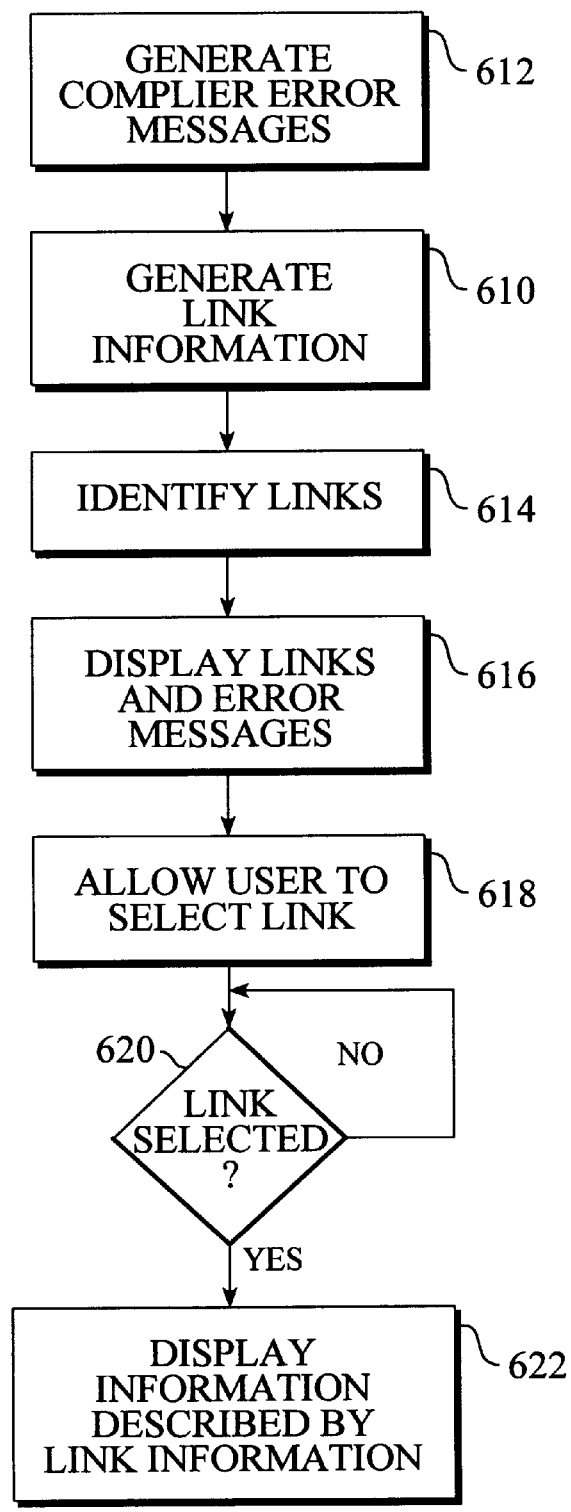
FIG. 6 is a flowchart illustrating a method of associating relevant information with compiler error messages according to one embodiment of the present invention.

Referring now to FIG. 6, one embodiment of a method of linking compiler error messages to relevant information is shown. Compiler error messages and link information are generated 610, 612, respectively. The link information may be generated after all of the compiler errors are generated or may be generated simultaneosly with the generation of the compiler errors. In one embodiment, error messages are codes, and in another embodiment, error messages contain explanatory text as described above. In one embodiment the link information includes identifiers for an application, or identifiers for information such as source code file name, line numbers and column numbers, or help file indices.

Links are identified and displayed along with the error messages 614, 616. In one embodiment, links are displayed by highlighting a portion of the error messages corresponding to the link, although in other embodiments, any displayed indicator of the link is sufficient. The user is allowed to select a link 618, and if selected 620, the information described by the link information is displayed 622.

Figure 7:
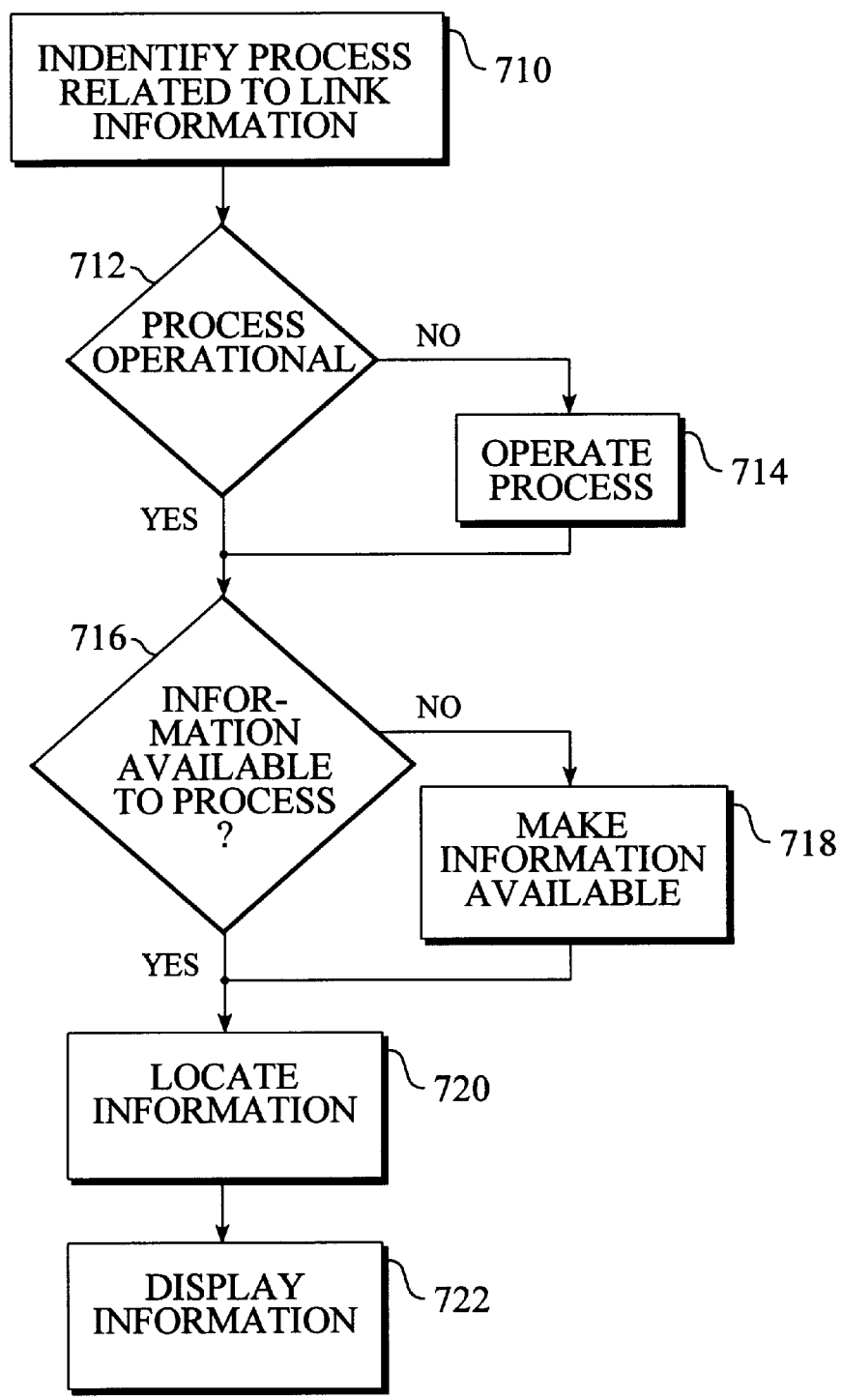
FIG. 7 is a flowchart of a method display information described by link information according to one embodiment of the present invention.

Referring now to FIG. 7, one embodiment of a method of displaying information described by link information is shown. A process related to the link information is identified from the link information 710. In one embodiment, processes include an editor and a help viewer. If the process is not operational, it is made operational 712, 714. If the information specified by the link information is not available to the process, such information is made available to the process 716, 718. In one embodiment, the information is located in a file, which is unavailable if the file is not opened by the process, and made available by generating and sending a command to the process to open the file. At least a part of the information specified by the link information is located and displayed 720, 722.

Figure 8:
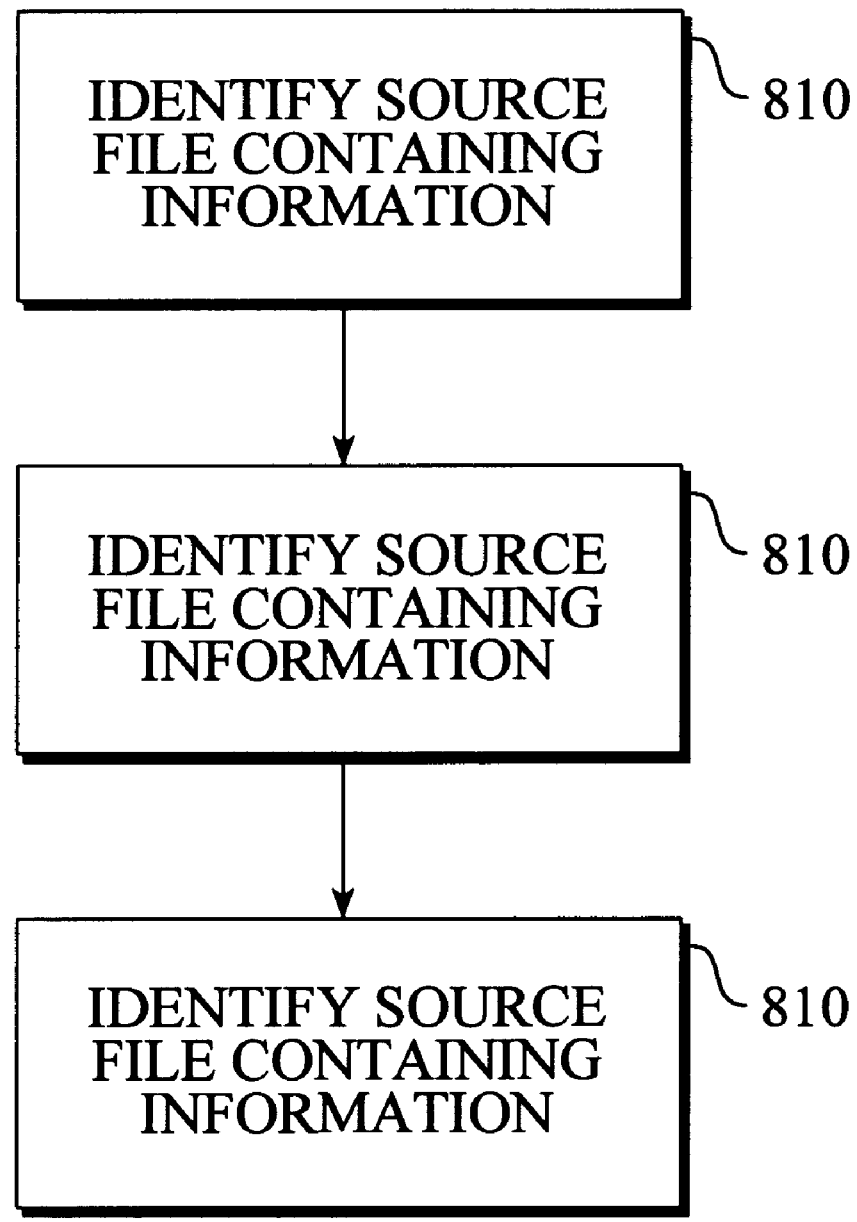
FIG. 8 is a flowchart illustrating a method of generating link information from a compiler error message according to one embodiment of the present invention.
Figure 9:
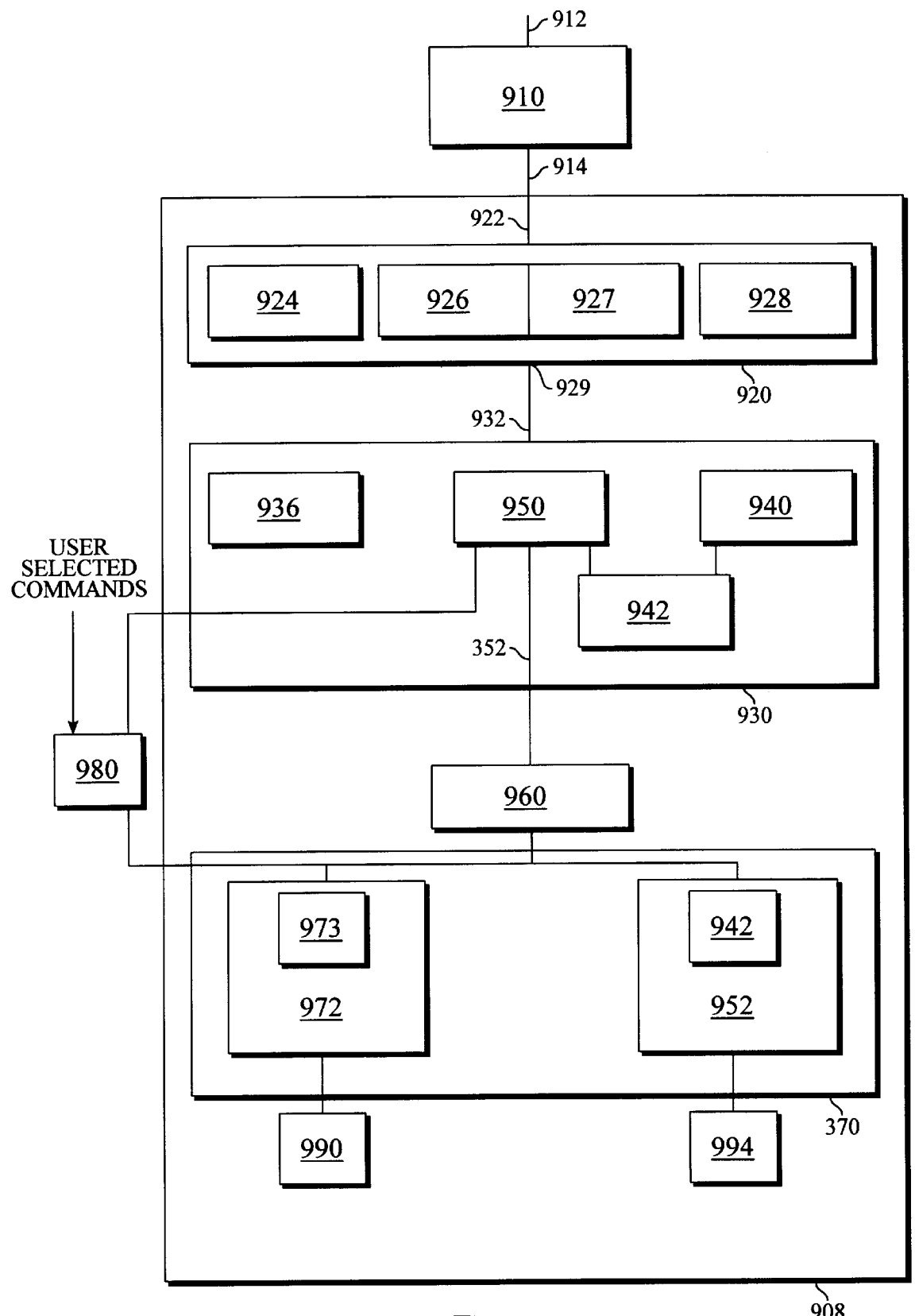
FIG. 9 is a block schematic diagram of an apparatus which relates relevant information to stacks according to another embodiment of the present invention.
Figure 10:
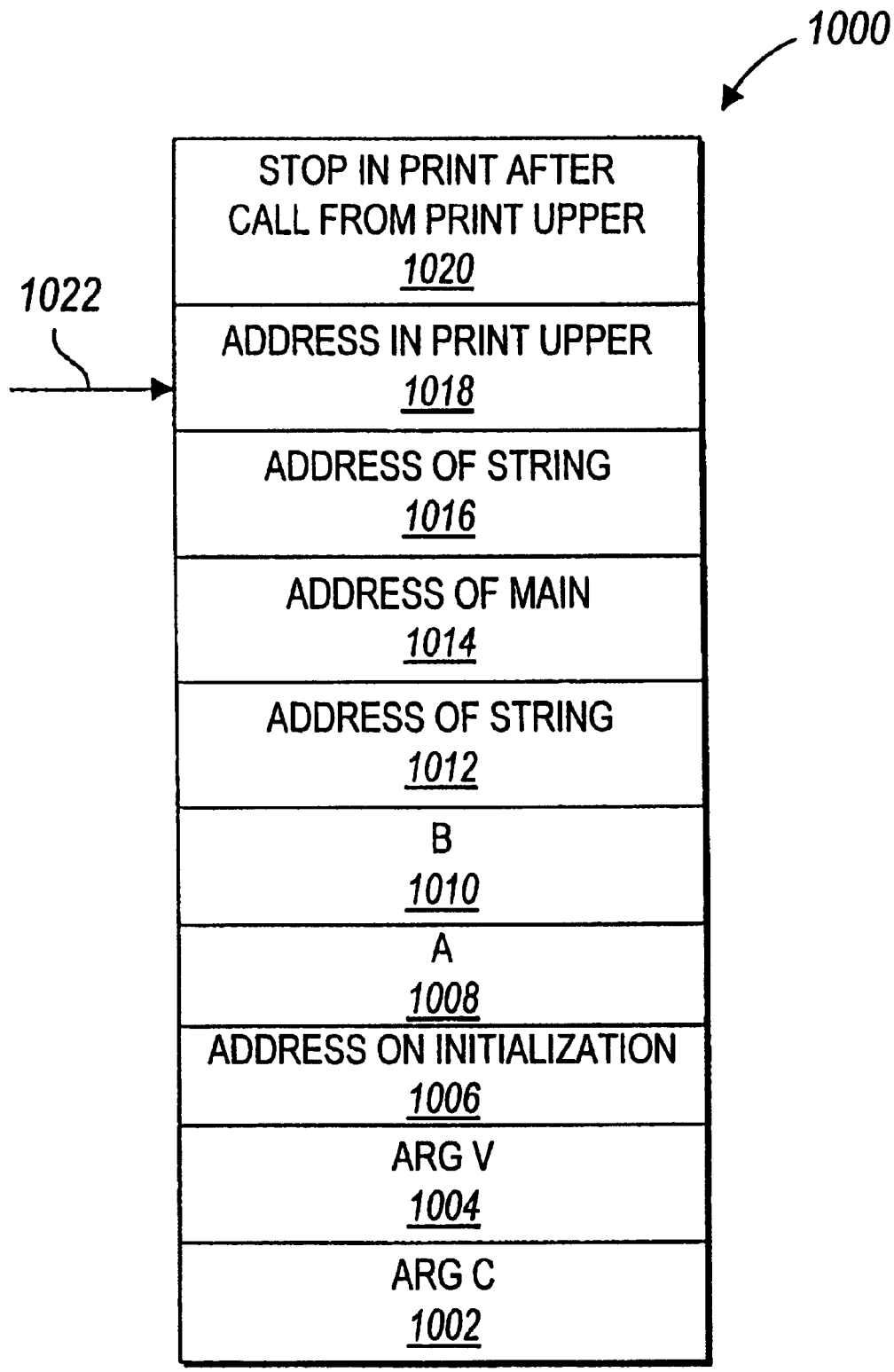
FIG. 10 is a pictorial illustration of the stack contents according to one embodiment of the present invention.

Referring now to FIG. 8, a method of generating link information from the compiler error message is shown. The name of a source file and location of certain information in the source file is identified from the compiler error message 810, 812, and the link information is assembled 814. In one embodiment, the name of the source file is inferred from the name of an application.

Referring now to FIGS. 1, 9, 10, 11, and 13, one embodiment of a system 908 for linking displayed stack information with relevant portions of the stack is shown. In one embodiment, system 908 is implemented in software and distributed on a computer program product to operate on a conventional computer system such as the computer system 109 shown in FIG. 1. Conventional compiler 910 accepts source files at its input 912 and generates a stack 1000 at its output 914. The stack 1000 stores the addresses of programs or instructions that the processor 101 has executed and local arguments, used to invoke a subroutine.

The stack 1000 includes entries 1002, 1004, 1006, 1008, 1010, 1012, 1014, 1016, 1018, and 1020 that contain the arguments used when a subroutine is invoked and the return addresses to which the processor 101 returns after executing the subroutine. Table I shows an exemplary main program that invokes a print program shown in Table II. As it executes, the computer program enters the arguments and return addresses in the stack 1000. For example, the main program enters the arguments 'v' and 'c' into entries 1002, 1004 and enters the address of initialization in entry 1006. The variables 'a', 'b' and the address of the character string are entered into entries 1008, 1010, 1012, respectively.

TABLE I

| 1. | Main (int argc, char**arv) |
| 2. | { |
| 3. | int a,b; |
| 4. | Char string[ ] = "Hello world\n"; |

TABLE I-continued

| 5. | |
| 6. | print upper (char * string); |
| 7. | } |
| 8. | |
| 9. | print upper (char * string) |
| 10. | { |
| 11. | char * ptr; |
| 12. | |
| 13. | For (ptr=string; *ptr!=0; ptr++) |
| 14. | *ptr = upper (*ptr); |
| 15. | |
| 16. | print (string); |
| 17. | } |

TABLE II

| 1. | print (char * string) |
| 2. | { |
| 3. | // stop her on entry |
| 4. | ; |
| n. | } |

When the main program invokes the print upper. program, the address of this instruction is entered into the entry 1014. After the print upper program is executed, the program returns to the address stored in entry 1014. The address of the character string executed by the print program is stored in entry 1016, and the return address to the print upper program is stored in entry 1018. After print, the stop command in the print upper program is stored in entry 1020. A stack pointer 1022 tracks the entry in the stack 1000.

In one embodiment, filter 920 accepts at its input 922 the stack 1000 from the output 914 of compiler 910. Scanner 924 scans each entry of the stack 1000 to identify the source file and address within the source file of the entry, as well as other information relevant to the entry. In one embodiment, scanner 924 scans the entry 1014 and identifies the file as main.c by the address in the entry 1014. Scanner 924 also locates and selects any text associated with the entry.

Markup text assembler 926 adds text to be used by the link manager 930 described below from text selected by the scanner 924 described above. In one embodiment, the markup text assembler 936 adds text in the form of hypertext markup language commands, or HTML commands. In one embodiment, markup text assembler 926 assembles markup commands corresponding to the selected text. The filename, column and line number selected by scanner 924 are assembled by markup text assembler 926 into markup reference 1320.

The text within parentheses is parsed by the links manager 930 to determine the program and parameters to the program which will be used to link the program to the stack, as described below. In one embodiment, a lookup table 927 is used to match the address of instructions to the program containing the instructions. The instruction to be used by the matched application follow the colon. Markup text assembler 926 builds the markup reference 1320 by adding the application name from lookup table 927 to a colon and the parameters, if any. Each reference 1320 is completed by markup text assembler 926 by adding the characters '<A HREF=' to the beginning of each markup reference 1320 and the character '>' to the end of each markup reference 1320.

Markup inserter 928 inserts the markup references in appropriate positions within the display messages 1102, 1104, 1106, 1108, 1110. In one embodiment, markup inserter 928 also inserts the characters '</A>' 1330 after the colon following the original position of the line number, and after each closing parenthesis following a parenthetical message, for use as described below. The characters </A>operate as end-of-link identifiers 1330. Filter 920 sends the completed messages 440, 444 to the filter output 929.

Figure 11:
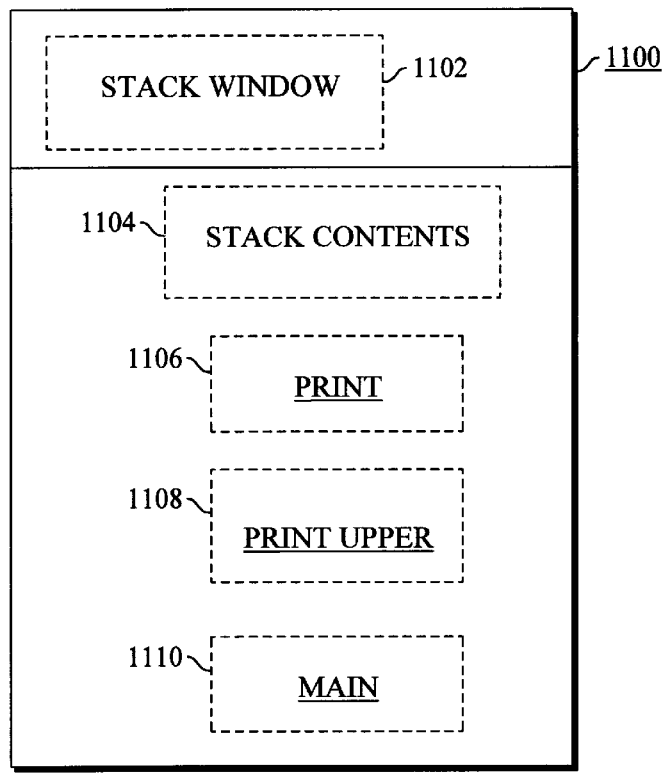
FIG. 11 is a pictorial illustration of a display screen showing linked entries of the stack contents according to one embodiment of the present invention.

Filter output 929 is coupled to an input 932 of links manager 930. Links manager 930 displays and allows the user to interact with links which may also include visual indicators such as highlighted portions or glyphs. Links scanner 936 scans the text at the links manager input 932 and identifies any markup references 1320 and end-of-link identifiers 1330. In one embodiment, links renderer 940 displays the completed stack display 1100 as a linked message in which markup references 1320 are not displayed, and end-of-link identifiers 1330 are not displayed, and text 1102, 1104, 1106, 1108, 1110 between each markup reference 1320 and the following end-of-link identifier 1330 is highlighted in some fashion, such as by underlining, changing the background color, or both, as shown in FIG. 11. Additionally, or alternatively, a glyph may be displayed near the text 1102, 1104, 1106, 1108, 1110 to provide a visual indicator. The highlighted text 1102, 1104, 1106, 1108, 1110, the glyph or both are also known as links 1102, 1104, 1106, 1108, 1110, while the information pertaining to the link is known as link information 1320. The links renderer 940 also maintains a table of links positions 942 containing the screen coordinates of each link 1320. Links renderer 940 also displays a window 1100 and allows the user to interact with the window 1100 by responding to scrolling and other commands for the display of the entries 1102, 1104, 1106, 1108, 1110 in the window 1110.

Links activator 950 is coupled to receive mouse button and position messages from the operating system 980. When a mouse button down message is received by links activator 950, it identifies the location of the mouse using position messages from the operating system and determines if the mouse is positioned over a link 1106, 1108, 1110 using the table of links positions 942 described above.

If the user has pressed and released a mouse button while the mouse is positioned over a link 1106, 1108, 1110, the markup reference 1320 preceding the link 1106, 1108, 1110 is sent by links activator 950 via output 952 to address resolver 960 which separates the parameters of a multiple parameter markup reference such as the markup references 1320, determines the application 994 or editor 990 corresponding to the link and calls the module 972, 974 corresponding to the application or editor, sending the separated parameters as parameters to the modules 972, 974.

Each module 972, 974 in control manager 970 operates an application 994 or editor 990 based upon the link 1106, 1108, 1110 selected by the user as described above. In one embodiment, if address resolver 960 receives a markup reference 1320 corresponding to the line number of the compiler source file, address resolver 960 calls editor control module 972 to run the editor 990 if the editor 990 is not already running, load the source file if it is not already loaded, display the line number indicated in the markup reference 1320 and position the editor cursor at the column number indicated in the markup reference 1320 to the right of the period. Editor control module 972 assembles the proper commands and sends it to the operating system 980 to start the editor, or to the editor 990 to load the source file or position the cursor and display the desired line number. In one embodiment, the operating system 980 is the SPARC-System operating system commercially available from Sun Microsystems, Inc. of Mountain View, Calif. In one embodiment, editor 990 is a conventional XEMACS editor.

Figure 12:
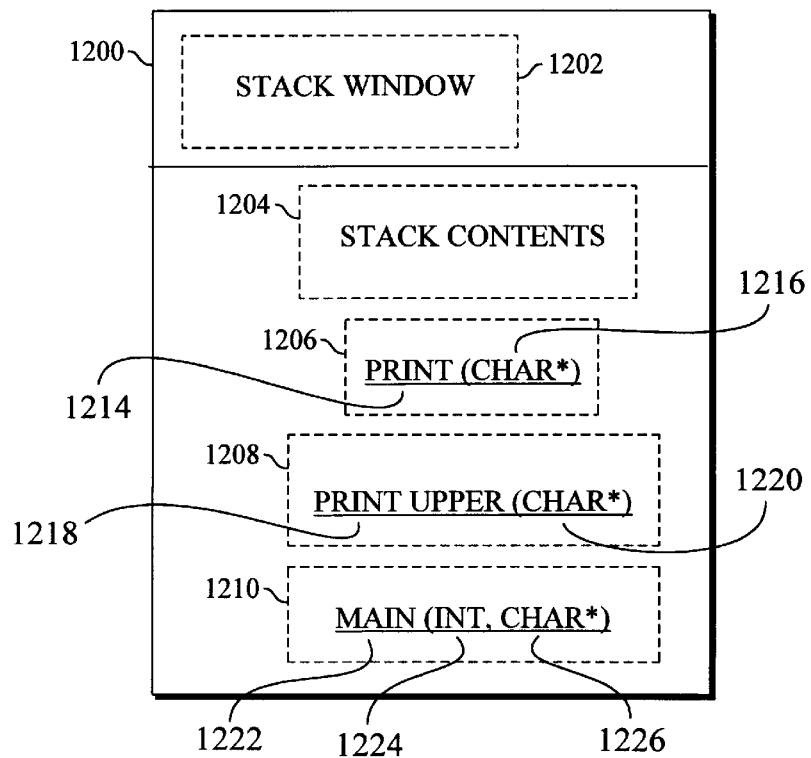
FIG. 12 is a pictorial illustration of a display screen showing linked entries of the stacked contents according to another embodiment of the present invention.
Figure 13:
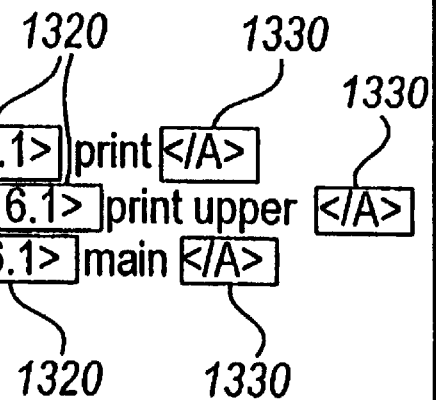
FIG. 13 is a pictorial illustration showing both hidden and visible text in a completed stack display according to an embodiment of the present invention.

Referring now to FIGS. 12 and 14, another embodiment of a display screen showing linked entries and of hidden and visible text, respectively, is shown. Markup inserter 928 inserts the markup references in appropriate positions with the display messages 1202, 1204, 1206, 1208, and 1210. The markup inserter 928 inserts the characters '</A>' 1330 which operate as end-of-link identifiers 1330. The display messages 1204, 1206, 1208, and 1210 include linked text 1214, 1218, and 1220, which are linked to corresponding programs and subroutines and also include linked text 1216, 1220, 1224, and 1226, which are linked to the instructions that initialize the variables associated with the text. The text includes markup references 1420 and 1430. The markup references 1420 are similar to the markup references 1320 described above, and processed similarly by the system 908. The markup reference 1430 provides a reference to variables used by the program. The links renderer 940 maintains a table of link positions 942 containing the screen coordinates of each link 1430. These links allow the user to interact with the links 1430 in a manner similar to the links 1330, as described above. In response to a user input, such as a mouse button down message, the links activator 950 identifies the location of the mouse using position messages from the operating system 980 and determines if the mouse is positioned over a link 1216, 1218, 1220, 1222, 1224, 1226 using the table of links position 942 described above.

If the user has pressed and released a mouse button while the mouse is positioned over a link 1214, 1216, 1218, 1220, 1222, 1224, 1226, the markup reference 1420 preceeding the link is sent by links activator 950 via output 952 to address resolver 960 which separates the parameters of a multiple parameter markup reference such as the markup references 1420, determines the variable corresponding to the link and calls the module 972 corresponding to the variable, sending the separated parameters as parameters to the module 972. The module searches the source code to determine the code that initialized the selected variable. The control module 972 displays the desired line number.

Figure 15:
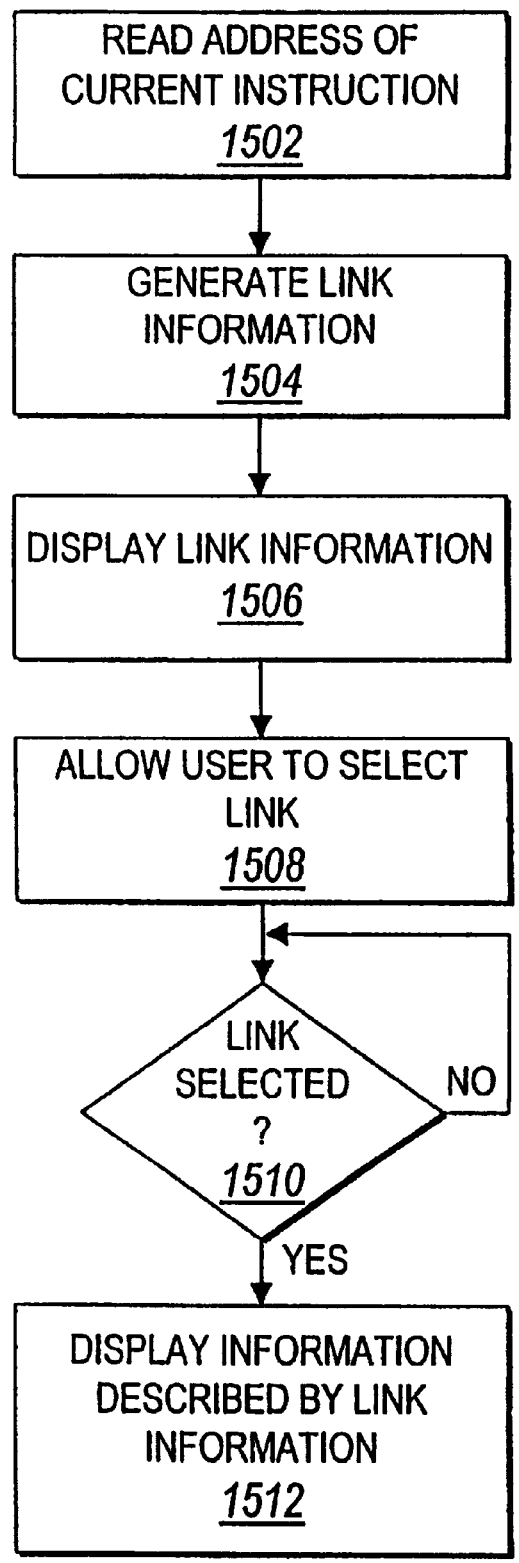
FIG. 15 is a flow chart illustrating a method associating relevant information with stack contents according to one embodiment of the present invention.

Referring now to FIG. 15, one embodiment of a method of linking stack information to relevant information is shown. The address of the current instruction is read 1502. The stack display link information is generated 1504. The link information may be generated after all of the stack entries are read or may be generated simultaneously with the reading of the stack entries. In one embodiment, the displayed stack does not include variables (see FIG. 11), and in another embodiment, the displayed stack includes variables (see FIG. 12). In one embodiment, the displayed stack includes explanatory text as described above. In one embodiment the link information includes identifiers for an application, or identifiers for information such as source code file name, line numbers and column numbers, or help file indices.

Links are displayed 1506. In one embodiment, links are displayed by highlighting a portion of the program name corresponding to the link, although in other embodiments, any displayed indicator of the link is sufficient. The user is allowed to select a link 1508, and if selected 1510, the information described by the link information is displayed 1512.

Referring now to FIG. 7, one embodiment of a method of displaying information described by link information is shown. A process related to the link information is identified from the link information 710. In one embodiment, processes include an editor and a help viewer. If the process is not operational, it is made operational 712, 714. If the information specified by the link information is not available to the process, such information is made available to the process 716, 718. In one embodiment, the information is located in a file, which is unavailable if the file is not opened by the process, and made available by generating and sending a command to the process to open the file. At least a part of the information specified by the link information is located and displayed 720, 722.

Figure 16:
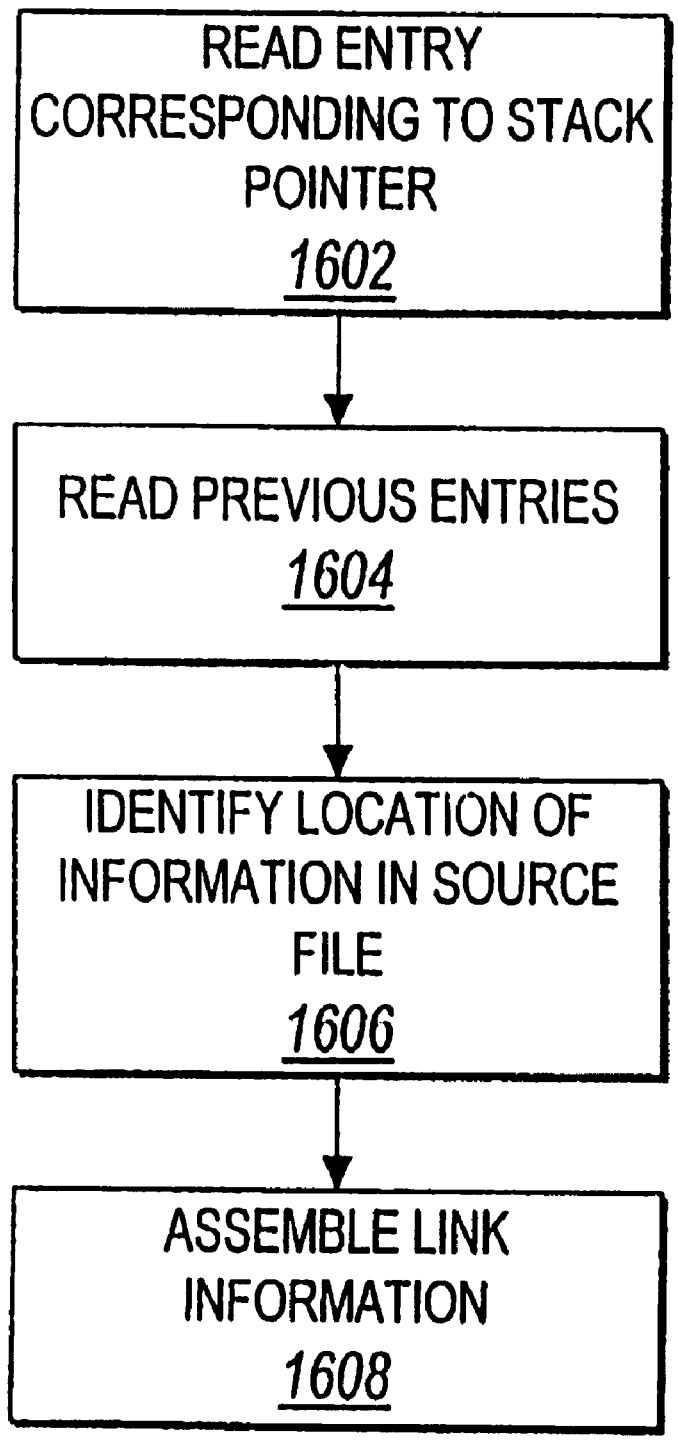
FIG. 16 is a flow chart illustrating a method of generating link information for a stack entry according to one embodiment of the present invention.

Referring now to FIG. 16, a method of generating link information from the compiler error message is shown. The entry of the stack 1000 corresponding to the stack pointer 1022 is read 1602. The previous entries of the stack 1000 below the stack pointer 1022 are read 1604. In particular, addresses in the stack 1000 are read to determine the address in the previously called routine where the program is to return at the end of the current routine. If the entry is a variable, the address of the location where the variable is declared is determined 1606. The name of a source file and location of certain information in the source file is identified from the stack entry 1000, and the link information is assembled 1608. In one embodiment, the name of the source file is inferred from the name of an application.

Appendix 1

```
;; eserv.el - - - Implements Emacs side of ESERVE-
Emacs_interface.
;; Copyright (C) 09 Jun 1995 Sun Microsystems, Inc.
;; Created:                July 1994
;; Version:                1.68
;; Header:                 @(#) eserve.el: v1.68 95/06/09 17:20:30
;; Keywords:               ESERVE GNU Emacs XEmacs integation
;;;; To Do:
;; Replace use of after-change-function with after-change-
functions
;;
;; User settable variables
;;
;; NOTE: If the user would rather the fkeys be left alone,
;; then the variable eserve-bind-fkeys should be set to nil
(before
;; emacs connects to the application)
;;
(defvar eserve-bind-fkeys t "if t, adds bindings for function
keys")
;;
;; %%%%%%%%%%%%%%%%%%%%%%%% user section ends %%%%%%%%%%%%%%%%%%
;;
(require 'cl)                              ;Common Lisp
compatibility
;;
;; Global variables
;;
;; Create and initialize global variables
;;
(defvar eserve-connection nil "ESERVE process object")
(defvar eserve-app-name nil "name of application attached to
emacs")
(defvar eserve-protocol-version 2' "Version of the_protocol to
ESERVE")
;; Determine whether we are running GNU Emacs v19 or XEmacs.
(defvar running-xemacs nil "t if we're running XEmacs")
(defvar running nil "t if we're running GNU Emacs 19")
(if (string-match " ^19\..*\\(XEmacs\\|Lucid\\)" emacs-
version)
      (setq running-xemacs t)
      (setq running-emacs t))
;; We need to use prime numbers here (e.g. 127, 509, . . .) to
reduce
the likeli-
;; hood of collisions.
(defvar eserve-buffers-marks-size 127 "Initial size of
buffers-mark vectors list")
(defvar eserve-mark-vector-chunk 127 "Size of eserve-mark-
vector chunk")
(defvar eserve-buffers-marks-list
   (make-hash-table :test 'eq :size eserve-buffers-marks-size)
   "Hash table containing buffers and their associated mark
vectors")
(defvar eserve-message-leftover nil "contains partial message
saved across buffer sends from eserve")
(defvar eserve-mark-type-list nil "the list of mark types
which describe the visible properties of a mark")
(defvar eserve-current-toolbar nil "The current ESERVE
toolbar")
(defvar eserve-toolbar-icon-height 25 "height of toolbar
icons")
```

-continued

Appendix 1

```
(defvar eserve-frame-previous-toolbar-alist nil "list of
frames and toolbar info")
(defvar eserve-toolbar-table nil
"A vector of vectors which holds the descriptions of toolbar
items
Each toolbar items comprises
0 file..........(string) the pixmap filename
1 verb..........(string) the verb (action) to be performed
2 help...........(string) the help text to display when over
the icon
3 needaFilePos..(boolean) indicates if file position should
also be sent
                with the verb
4 offset.........(integer) the spacing (in pixels) to the
previous icon
                or edge. This is treated as a
hint by
Emacs and
                may be rounded up or down modulo
                pixels/default-character width.
5 label........(string) a label to use if an iconcan'tbe
created.")
(defvar eserve-fkey-functions nil
"list of name of applications binding fkeys")
(defvar eserve-startup-file nil "file contains code to connect
app/emacs")
(defvar eserve-startup-envvar "SPRO-EDITOR_RENDEZVOUS_FILE"
"env
var whose value indicates the startup file")
(defvar eserve-menus nil "list of app-defined menus")
(defvar eserve-verb-hash-size 127 "initial size of eserve-
verb-button-hash table")
(defvar eserve-verb-button-hash
   (make-hash-table :test 'equal :Size eserve-verb-hash-size)
   "Hash table containing verb strings and their associated
buttons")
(defvar eserve-vc-next-op-item nil "holds VC next_operation
menu
item")
(defvar eserve-vc-teardown-menu nil "if t, tear down VC menu
at cleanup time")
;;
;; Debugging and tracing
;;
(defvar eserve-log-buffer nil "log for eserve/emacs message
traffic")
(cond
   ((getenv "HB_DEBUG")
      (setq debut-on-error t)
      (setq eserve-log-buffer (get-buffer-create " *eserve-
log"))))
(defun eserve-log-text (string)
   (cond
      ((and eserve-log-buffer
         (buffer-name eserve-log-buffer))
       (save-excursion
         (set-buffer eserve-log-buffer)
         (goto-char (point-max))
         (insert string)))))
;;
;; eserve initialization
;;
(defun eserve-init ( )
   "Initializes Emacs for communication with ESERVE. This
function is called from
the command line which invokes Emacs."
   (eserve-log-text (format "%s started.\n" emacs-version))
   (eserve-log-test (format "%s\n" command-line-args))
   ;; GNU Emacs 19 - XEmacs compatibility
   (unless (fboundp 'raise-frame) (fset 'raise-frame 'raise-
screen))
   (unless (fboundp 'window-frame) (fset 'window-frame 'window-
screen))
   ;; Choose the correct overlay-or-extent creation & deletion
functions.
   (when running-xemacs
      (defalias 'eserve-vc-setup 'eserve-xemacs-vc-setup)
```

Appendix 1

```
    (defalias 'eserve-vc-cleanup 'eserve-xemacs-vc cleanup)
    (defalias 'eserve-add-menus 'eserve-xemacs-add-menus)
    (defalias 'eserve-delete-menus 'eserve-xemacs-delete-
menus)
    (defalias 'eserve-create-overlay-or-extent 'eserve-xemacs-
create-extent)
    (defalias 'eserve-delete-overlay-or-extent 'eserve-xemacs-
delete-extent)
    (defalias 'eserve-set-overlay-or-extent 'eserve-xemacs-
set-extent))
  when running-emacs
    (defalias 'eserve-vc-setup 'eserve-xemacs-vc-setup)
    (defalias 'eserve-vc-cleanup 'eserve-xemacs-vc cleanup)
    (defalias 'eserve-add-menus 'eserve-xemacs-add-menus)
    (defalias 'eserve-delete-menus 'eserve-xemacs-delete-menus)
    (defalias 'eserve-create-overlay-or-extent 'eserve-emacs-
create-overlay)
    (defalias 'eserve-delete-overlay-or-extent 'eserve-emacs-
delete-overlay)
    (defalias 'eserve-set-overlay-or-extent 'eserve-emacs-
set-overlay))
  ;; Make the function which is run after a change in a buffer
local to that
  ;; buffer.
  (make-variable-buffer-local 'after-change-function) ;TBD:
Obsolete
  ;; Create a new face with which to highlight errors, etc.
  (copy-face 'default 'eserve-highlight)
  (eserve-xpm-setup)
  (eserve-vc-setup)
;; load startup file if it exists
  (let ((startup-file nil))
    (cond
    ((setq eserve-startup-file (getenv eserve-startup-
envvar))
    (eserve-load-startup-envvar nil)))))
;;
;; eserve process communication functions
;;
(defun eserve-connection-filter (process output)
  "Handles output from eserve process."
  (set-process-filter eserve-connection t)
  (unwind-protect
      (condition-case err-msg
        (progn
          (eserve-log-text (format "%s" output))
          (eserve-eval-cmds output))
      (error
      (progn
        (message (format "Error: %s - occurred during eserve
msg evaluation" err-msg))
        (eserve-log-test (format "Error: %s - occurred during
eserve msg evaluation\n" err-msg)))))
    (set-process-filter eserve-connection 'eserve-connection-
filter))
    (set-process-filter eserve-connection 'eserve-connection-
filter))
(defun eserve-connection-sentinel (process status)
  "Handles changes in status to ESERVE process."
  (cond
  ((memq (process-status process) '(signal exit closed))
    (cond
      (eserve-app-name
        (message (format "connection to %s terminated" eserve-
app-name)))
      (t
      (message "message "connection to eserve terminated")))
      (eserve-connection-cleanup))))
(defun eserve-connection-cleanup ( )
  "Cleans up after ESERVE connection is broken"
  (eserve-cleanup)
  (setq eserve-connection nil))
(defun eserve-cleanup ( )
  "Cleans up ESERVE related information"
  (eserve-clear-all-marks
  (remove-hook 'kill-buffer-hook 'eserve-kill-buffer-hook)
  (remove-hook find-file-hooks 'eserve-find-file-hook)
```

-continued

Appendix 1

```
   (remove-hook after-save-hook 'eserve-after-save-hook)
   (remove-hook first-change-hook 'eserve-first-change-hook)
   (clrhash eserve-buffers-marks-list)
   (setq eserve-mark-type-list nil)
   (setq eserve-message-leftover nil)
   (setq eserve-app-name nil)
   (eserve-delete-menus eserve-menus)
   (clrhash eserve-verb-button-hash)
   (eserve-xpm-cleanup)
   (eserve-toolbar-cleanup)
   (eserve-vc-cleanup)
   (cond
      (running-emacs ;; menu removal bug
         (redraw-display))))
(defun eserve-quit ( )
  "aborts currently launching application and disconnects from
it"
   (eserve-launch-timer-reset)
   (cond
   (eserve-launch-process
      (delete-process eserve-launch-process)
      (eserve-launch-process-cleanup)))
(cond
   (eserve-connection
      (delete-process eserve-connection)))
   (eserve-connection-cleanup))
(defun eserve-xpm-setup ( )
  "sets up the xpm-color-symbols list"
  (when running-xemacs
      (cond
      ((not (assoc "FgColor" xpm-color-symbols))
      (setq xpm-color-symbols
         (append (list
            '("FgColor" (face-foreground 'default))
            '("BgColor" (face-background 'default)))
            xpm-color-symbols))))))
(defun eserve-xpm-cleanup ( )
  "restores the xpm-color-symbols list"
  (cond
      (running-xemacs
      (let ((bg-color-attr (assoc "BgColor" xpm-color-symbols))
         (fg-color-attr (assoc "FgColor" xpm-color-symbols)))
      (cond
         (bg-color-attr
         (setq xpm-color-symbols (delq bg-color-attr xpm-color-
symbols))))
         (fg-color-attr
         (setq xpm-color-symbols (delq fg-color-attr xpm-color-
symbols)))))))
(defun eserve-toolbar-cleanup ( )
  "restores emacs to the pre-eserve-toolbar state"
  (cond
      (running-xemacs
         (cond
         (eserve-use-bb-toolbar ;; - 19.11
            (cond
               ((fboundp 'toolbar)
         (toolbar 0)))) ;hide the ESERVE toolbar window
      (t
         (mapcar 'lambda (tb-info) (eserve-restore-frame-toolbar
tb-info))
               eserve-frame-previous-toolbar-alist)
         (setq eserve-frame-previous-toolbar-alist nil)))
         (setq eserve-current-toolbar nil))))
(defun eserve-eval-cmds (msgs)
  "reads and evaluates commands from eserve message stream"
   (let ((current-cmd-str nil)
         (current-cmd nil)
         (cmd-front 0)
         (index 0)
         (cmds nil)
         (cmds-len 0))
      (cond
      (eserve-message-leftover
         setq cmds (concat eserve-message-leftover msgs))
         setq eserve-message-leftover nil))
      (t
```

Appendix 1

```
        setq cmds (concat msgs))))
    (setq eserve-message-buffer nil)
    (setq cmds-len (length cmds))
    (while (< index cmds-len)
      ;; find a command
      (setq cmd-front index)
      (while (and (< index cmds-len)
                  (not (char-equal (aref cmds index) ?\n)))
          (setq index (+ index 1)))
        ;; check for message been split across buffers
        (cond
        ((and
            (>= index cmds-len)
            (not (char-equal (aref cmds (- index 1)) ?\n)))
          (setq eserve-message-leftover (substring cmds cmd-front index)))
        (t
          (setq current-cmd-str (substring cmds cmd-front index))
          (setq current-cmd (read-from-string current-cmd-str))
          (eval (car current-cmd))
          ;; go past newline
          (setq index (+ index 1))))))
)
(defun eserve-set-app-name (app-name)
  "Set the name of the app connected to eserve"
  (setq eserve-app-name app-name))
(defun eserve-connect (eserve-portnum)
  "Connects to the ESERVE process"
  (condition-case err-msg
      (progn
        (cond
        ((not eserve-app-name)
          (setq eserve-app-name "eserve")))
        (setq eserve-connection (open-network-stream "eserve connection"
                                nil
                                "localhost"
                                eserve-portnum))
        (set-process-filter eserve-connection 'eserve-connection-filter)
        (set-process-sentinel eserve-connection 'eserve-connection-sentinel)
        (eserve-event-connected)
        (add-hook 'kill-buffer-hook 'eserve-kill-buffer-hook)
        (add-hook 'find-file-hooks 'eserve-find-file-hook)
        (add-hook 'after-save-hook 'eserve-after-save-hook)
        (add-hook 'first-change-hook 'eserve-first-change-hook)
        (cond
        (eserve-bind-fkeys
          (eserve-init-fkey-functions))))
    (error (message "%s: Could not connect to %s: Please fix and retry."
                    err-msg eserve-app-name))))
(defun eserve-load-startup-file
  "loads the file containing code to start the connection between eserve/emacs"
    (cond
    ((and eserve-startup-file
        (stringp eserve-startup-file)
      (> (length eserve-startup-file) 0))
(cond
  ((file-exists-p eserve-startup-file)
    (load eserve-startup-file)
    (delete-file eserve-startup-file)))
(setq eserve-startup-file nil))))
(defun eserve-process-send-string (process str)
"send STR to the eserve process over the connection to eserve"
(cond
(process
(process-send-string process str))))
(defun eserve-send-verb (verb &optional needaFilePos)
"send a tool verb to ESERVE"
  (cond
```

Appendix 1

```
   (eserve-connection
      (let ((file-name (buffer-file-name (current-buffer)))
            (current-line (eserve-cursor-line))
            (current-col (eserve-current-selection))
         (selection (eserve-current-selection))
         (message-str nil))
      (if (not selection)
      (setq selection " "))
(if (not file-name)
   (setq file-name "NULL"))
   (setq message-str
      (format "toolVerb %s %a %d, %d -1, -1 -1, -1 %d %s\n"
      verb file-name
      (+ current-line 1)
      (+ current-col 1)
      (length selection) selection))
   (eserve-log-test (format "(%s)\n" message-str))
   (eserve-process-send-string eserve-connection message-
str)))))
(defun eserve-send-ack (ack-nilm)
"send an ack to ESERVE"
(let ((ack (format "ack %d\n" ack-num)))
   (eserve-log-text (format "(%s)\n" ack))
   (eserve-process-send-string eserve-connection ack)))
;;
;; functions to invoke eserve from emacs
;;
(defvar eserve-launch-process nil)
(defvar eserve-launch-timer-max 180)
(defvar eserve-launch-timer-increment 5)
(defvar eserve-launch-timer-process nil)
(defvar eserve-launch-current-time 0)
(defvar eserve-launch-abort nil)
(defun eserve-app-start (app-name)
   "invokes an application from emacs"
   (cond
   ((not (stringp app-name))
      (message "No application name specified")
      nil)
   ((or eserve-connection eserve-launch-process)
      (message "Already connected, please exit application")
      nil)
(t
   (setq eserve-app-name app-name)
   (eserve-init)
   (eserve-launch-app)
   t)))
(defun eserve-launch-timer-sentinel (proc str)
   (let ((stat (process-status proc)))
      (cond
      ((memq stat '(exit signal))
      (setq eserve-launch-timer-process nil)
      (eserve-launch-timer-timeout)))))
(defun eserve-launch-timer-reset ( )
   (setq eserve-launch-current-time 0)
   (cond
      (eserve-launch-timer process
      (setq eserve-launch-abort t)
      (eserve-kill-launch-timer))))
(defun eserve-kill-launch-timer ( )
   (cond ((and eserve-launch-timer-process
            (eq (process-status eserve-launch-timer-process)
'run))
         (delete-process eserve-launch-timer-process)))
         (setq eserve-launch-timer process nil))
(defun eserve-setup-launch-timer ( )
   (setq eserve-launch-timer-process
      (start-process "launch timer process" nil "sleep"
                  (int-to-string eserve-launch-timer-
increment)))
   (set-process sentinel eserve-launch-timer-process 'eserve-
launch-timer-sentinel))
(defun eserve-launch-timer-timeout ( )
   (let ((startup-file-exists (fine-readable-p eserve-startup-
file)))
      (setq eserve-launch-current-time
         (+ eserve-launch-current-time eserve-launch-timer-
```

-continued

Appendix 1

```
increment))
   (cond
      eserve-launch-abort
      (message "Connection aborted.")
      (setq eserve-launch-abort nil))
      (startup-file-exists
      (eserve-load-startup-file)
      (eserve-launch-timer-reset)
      (message (format "Connection to %s established"
eserve-app-name)))
      ((>= eserve-launch-current-time eserve-launch-timer-
max)
      (eserve-launch-timer-reset)
      (message (format "Error: Could not connect to %s"
eserve-app-name)))
      (t
      (message (format "Waiting for %s to connect . . ."
eserve-app-name))
      eserve-setup-launch-timer)))))
(defun eserve-launch-app ( )
   (setq eserve-startup-file (make-temp-name "/tmp/emacs"))
   (setenv"SPROEDITORRENDEZVOUSFILE"eserve-startup-file)
   (condition-caseerr-msg
      (progn
      (setqeserve-launch-process(start-processreserve
launch"nileserve-app-name))
      (message (format "Waiting for %s to connect . . ." eserve-
app-name)))
      (file-error
         (message
         (format "Could not find %s, please check your PATH
variable"
         eserve-app-name))))
   (setenv "SPRO_EDITOR_RENDEZVOUS_FILE" nil)
   (cond
      (eserve-launch-process
      (eserve-setup-launch-timer)
      (set-process-sentinel eserve-launch-process 'eserve-launch-
process-sentinel))))
(defun eserve-launch-process-cleanup ( )
   "Cleans up after ESERVE process has terminated"
   (setq eserve-launch-process nil))
(defun eserve-launch-process-sentinel (process status)
   "Handles changes in status to ESERVE process."
   (cond
   ((memq (process-status process) '(signal exit closed))
;; (message (format "%s has terminated" eserve-app-name))
      (eserve-launch-process-cleanup))))
;;
;; eserve protocol functions for file and marker management
;;
(defun eserve-quit-emacs ( )
   "brings down emacs on behalf of eserve"
   (kill-emacs))
(defun eserve-load-file (file-to-load)
   "loads a file into a buffer on behalf of eserve"
   (let ((file-buffer (eserve-file-to-buffer file-to-load)))
      (cond
         ((not file-buffer)
         (cond
         ((file-exists-p file-to-load)
         (setq file-buffer (find-file file-to-load)))
         (t
         (setq file-buffer (switch-to-buffer
                     (create-file-buffer file-to-load)))))))
      (message " ")
      (eserve-show-buffer file-buffer)))
(defun eserve-save-file (file-to save)
"saves a file on behalf of eserve"
(let ((file-buffer (eserve-file-to-buffer file-to-save)))
   (cond
      (file-buffer
         (save-excursion
         (set-buffer file-buffer)
         (save-buffer))
         (message
(defun eserve-front-file (file-to-front)
```

Appendix 1

```
"switches a buffer, and raises its window to the front on
behalf of eserve"
   (let ((file-buffer (eserve-file-to-buffer file-to-front)))
      (cond
        (file-buffer
        (switch-to-buffer file-buffer)
        (eserve-raise-buffer file-buffer)))))
(defun eserve-show-file (file-to-show)
   "switches a buffer to the front on behalf of eserve"
   (let ((file-buffer (eserve-file-to-buffer file-to-show)))
      (eserve-show-buffer file-buffer)))
(defun eserve-set-mark (file-name line-nilm mark-id mark-type)
   "creates a mark in file-name at line line-num of type mark-
type"
   (let ((file-buffer (eserve-file-to-buffer-create file-
name)))
      (if file-buffer
        (let ((eserve-mark (eserve-make-eserve-mark file-
buffer line-num mark-id mark-type)))
          (eserve-add-mark eserve-mark)
          (if (\= mark-type 0)
            (eserve-mark-change-mark-type eserve-mark mark-
type))))))
(defun eserve-delete-mark (file-name mark-id)
"deletes a MARKID from FILENAME"
(let ((file-buffer (eserve-file-to-buffer-create file-name)))
   (if file-buffer
          (eserve-remove-mark file-buffer mark-id))))
(defun eserve-goto-mark (file-name mark-id msg)
   "warps to the mark associated with MARKID in FILENAME
showing
MSG"
   (let ((file-buffer (eserve-file-to-buffer file-name)))
      (if file-buffer
         (let ((eserve-mark (eserve-get-mark file-buffer mark-
id))
               (emark nil))
            (setq emark (eserve-mark-mark eserve-mark))
            (goto-char (marker-position emark))
         (switch-to-buffer file-buffer)
         (cond
           ((> (length msg) 0)
         (message " ")
         (princ msg t)))))))
(defun eserve-goto-line (file-name line-num)
   "warps to LINENUM in FILENAME"
   (let ((file-buffer (eserve-file-to-buffer file-name)))
      (if file-buffer
         (let ((pos (eserve-line-to-pos file-buffer line-num)))
            (goto-char pos)
         (switch-to-buffer file-buffer)))))
(defun eserve-get-mark-type (pos mark-type-list)
   ;; Return the mark-type in position POS in MARK-TYPE-LIST.
(aref mark-type-list pos))
(defun eserve-change-mark-type (file-name mark-id new-type)
;; Change in FILE NAME the type of mark MAR.K ID to NEW
TYPE.
   (let
         (eserve-mark (eserve-get-mark (eserve-file-to-buffer
file-name) mark-id)))
      (eserve-mark-change-mark-type eserve-mark new-type)))
(defun eserve-set-mark-type-list (mark-type-list)
;; Set eserve-mark-type-list to MARK TYPE LIST and perform
any needed
   ;; initializations. Return TBD if successful or signal an
error.
   (cond
   ;; Sanity checks . . .
   ((not (vectorp mark-type-list)) (signal 'wrong-type-argument
'( )))
   ;; . . . passed.
   (t
      (setq eserve-mark-type-list mark-type-list)
      (eserve-init-mark-types mark-type-list))))
;;;
;;; protocol support functions
;;;
```

-continued

Appendix 1

```
(defun eserve-add-mark (eserve-mark)
  ;; Add a mark to the list of marks for the corresponding
buffer.
  (let ((buff (eserve-mark-buffer eserve-mark))
        (mark-list nil)
        (mark-id (eserve-mark-id eserve-mark)))
    (setq mark-list (eserve-get-buffer-marks buff))
    (cond
      ((not mark-list)
       (setq mark-list (eserve-create-buffer-marks buff))))
    (cond
      ((>= mark-id (length mark-list))
       (setq mark-list (eserve-grow-vector mark-list mark-id
eserve-mark-vector-chunk))
       (eserve-set-buffer-marks buff mark-list)))
    ;; check for old mark not deleted
    (let ((old-mark (aref mark-list mark-id)))
      (cond
        (old-mark
         (eserve-mark-clear-renderer old-mark))))
    (aset mark-list mark-id eserve-mark)))
(defun eserve-remove-mark (file-buffer mark-id)
  "removes mark corresponding to MARKID from FILEBUFFERS's list
of marks"
  (let ((mark-list (eserve-get-buffer-marks file-buffer)))
    (cond
      (mark-list
       (let ((eserve-mark (aref mark-list mark-id)))
         (cond
           (eserve-mark
            (eserve-mark-clear-renderer eserve-mark)
            (aset mark-list mark-id nil))))))))
(defun eserve-get-mark (file-buffer mark-id)
  "returns the eservemark associated with MARKID and BUFFER"
  (let ((mark-list (eserve-get-buffer-marks file-buffer))
        (list-size ))
    setq list-size (length mark-list))
    (cond
      ((< mark-id list-size)
       (aref mark-list mark-id)
      (t nil))))
(defun eserve-get-buffer-marks (file-buffer)
  "returns the marks associated with BUFFER"
  (cl-gethash file-buffer eserve-buffers-marks-list))
(defun eserve-set-buffer-marks (file-buffer mark-list)
  "associates MARKLIST with BUFFER"
  (cl-puthash file-buffer mark-list eserve-buffers-marks-
list))
(defun eserve-delete-buffer-marks (file-buffer)
  "disassociates MARKLIST with BUFFER, deletes buffer from
list"
  (cl-remhash file-buffer eserve-buffers-marks-list))
(defun eserve-create-buffer-marks (file-buffer)
  "creates a marks list and associates it with BUFFER, RETURNS
mark list"
  (let ((mark-list (make-vector eserve-mark-vector-chunk
nil)))
    (eserve-set-buffer-marks file-buffer mark-list) mark-
list))
(defun eserve-grow-vector (vector-to grow max-index chunk-
size)
  "extend LIST TO GROW to contain MAX INDEX, RETURN new
VECTOR"
  (let ((new-size (* chunk-size
                     (+ (\ max-index chunk-size) 1)))
        (size-diff 0)
        (new-vector nil))
    (setq size-diff (- new-size (length vector-to-grow)))
    (setq new-vector (vconcat vector-to-grow (make-vector size-
diff
nil)))))
(defun eserve-mark-change-mark-type (eserve-mark mark-type-
index)
  ;; Change ESERVE MARK to NEW MARK TYPE
  (save-excursion
    (set-buffer (eserve-mark-buffer eserve-mark))
    (goto-char (marker-position (eserve-mark-mark eserve-
```

-continued

Appendix 1

```
mark)))
   (let
       (new-mark-type (eserve-get-mark-type mark-type-index
eserve-mark-type-list))
         (beg-point (progn (beginning-of-line) (point)))
         (end-point (progn (end-of-line) (point))))
       ;; clear out old visual if it exists
       (eserve-mark-clear-renderer eserve-mark)
       (if (eserve-mark-type-face new-mark-type)
       (eserve-set-mark-renderer
       eserve-mark (eserve-create-overlay-or-extent
              new-mark-type beg-point end-point))))))
(defun eserve-mark-clear-renderer (eserve-mark)
   ;; remove visual remains of ESERVE MARK
   if eserve-mark
     (let ((old-renderer (eserve-mark-renderer eserve-mark)))
       (if old-renderer
         (save-excursion
           (set-buffer (eserve-mark-buffer eserve-mark))
           (eserve-delete-overlay-or-extent old-renderer)
           (eserve-set-mark-renderer eserve-mark nil))))))
(defun eserve-clear-buffer-marks (buff marks-list)
   "clears visuals for all ESERVE marks in the given buffer"
   (cond
   ((and buff marks-list)
       (mapcar 'eserve-mark-clear-renderer marks-list))))
(defun eserve-clear-all-marks
   "removes visuals backing all ESERVE marks in all buffers"
   (cond
   (eserve-buffers-marks-list
     (maphash 'eserve-clear-buffer-marks eserve-buffers-marks-
list))))
;;
;; editor state message functions
;;
(defun eserve-get-cursor-row-test ( )
   "Send the test of the line the cursor is on the ESERVE"
   (save-excursion
   (let ((beg (progn (beginning-of-line) (point)))
     (end (progn (end-of-line) (point)))
     (message-string nil)
     (row-test-str nil)
     (setq row-text-str (buffer-substring beg end))
     (setq message-string (format "cursorRowText %d %s\n"
             (length row-text-str)
             row-text-str))
     (eserve-process-send-string eserve-connection message-
string))))
(defun eserve-get-cursor-row ( )
   "Send the row number of the line the cursor is on to ESERVE"
   (save-excursion
   (let ((row-num (eserve-cursor-line))
       (message-string nil))
     (setg message-string (format "cursorRow %d/n" row-num))
     (eserve-process-send-string eserve-connection message-
string))))
(defun eserve-get-cursor-col ( )
   "Send the column number of the cursor on the line the cursor
is on to ESERVE"
   (save-excursion
   (let ((col-num (current-column))
     (message-string nil))
     (setq message-string (format "cursorCol %d\n" col-num))
     (eserve-process-send-string eserve-connections message-
string))))
(defun eserve-get-selected-test ( )
   "Send the text of the current selection on to ESERVE"
   (save-excursion
   (let ((sel-text (eserve-get-selection))
   (sel-text-length 0)
   (message-string nil))
(if (not sel-text)
   (setq sel-text " "))
(setq sel-text-length (length sel-text))
(setq message-string (format "selectedText %d %s\n"
         sel-text-length sel-text)))
(eserve-process-send-string eserve-connection message-
```

-continued

Appendix 1

```
string)))
;;
;; eserve-mark object functions
;;
;;
;; an eservemark object has the form:
;;   [eservemark MARK-ID MARK-TYPE MARK RENDER]
;;
;; 'eservemark     :   symbol, identifies this vector as_an
eserve-
mark
;; mark-id : interger, used by ESERVE
;; mark-type : integer, index into the vector eserve-mark-
type-
list
;; mark : mark, the mark itself
;; renderer : overlay or extent
(defun eserve-markp (x)
    "returns t if x is an eservemark"
    (and (vectorp x) (= (length x) 5) (eq (aref x 0)
'eservemark)))
(defun eserve-mark-id (eservemark)
    "returns the id of an eservemark"
    (aref eservemark 1))
(defun eserve-mark-type (eservemark)
    "returns the type of an eservemark"
    (aref eservemark 2))
(defun eserve-mark-mark (eservemark)
    "returns the emacs mark for an eservemark"
    (aref eservemark 3))
(defun eserve-mark-renderer (eservemark)
    "returns the overlay or extent of an eservemark"
    (aref eservemark 4))
(defun eserve-mark-buffer (eservemark)
    "returns the buffer of an eservemark"
    (marker-buffer (eserve-mark-mark eservemark)))
(defun eserve-set-mark-id (eservemark new-id)
    "sets the id of an eservemark"
    (aset eservemark 1 new-id))
(defun eserve-set-mark-type (eservemark new-type)
    "sets the type of an eservemark"
    (aset eservemark 2 new-type))
(defun eserve-set-mark-mark (eservemark new-mark)
    "sets the emacs mark for an eservemark"
    (aset eservemark 3 new-mark))
(defun eserve-set-mark-renderer (eservemark new-renderer)
    "sets the emacs overlay or extent for eservemark"
    (aset eservemark 4 new-renderer))
(defun eserve-mark-eserve-mark (file-buffer line-num mark-id
mark-type
    "creates an eservemark object at line line-num in-buffer
file-buffer"
    (let ((eservemark (make-vector 5 nil))
        (emark (make-marker))
        (buffpos (eserve-line-to-pos file-buffer line-num)))
    (aset eservemark 0 'eservemark)
    (eserve-set-mark-id eservemark mark-id)
    (eserve-set-mark-type eservemark mark-type)
    (eserve-set-mark-mark eservemark emark)
    (set-marker emark buffpos file-buffer)
    (eserve-set-mark-renderer eservemark nil)
    eservemark))
;;
;; eserve-mark-type object functions
;;
;;
;; an eserve-mark-type object has the form
;;   [fgcolor bgcolor glyphfile glyph face]
;;
;; fgColor : string the foreground color of the mark
;; bgColor : string the background color of the mark
;; glyphFile : string the pathname of the XPM/XBM glyph of
this
mark
;; glyph : glyph the glyph itself
;; face : face the face of the highlighted line
;;
```

-continued

Appendix 1

```
(defsubst eserve-mark-type-fgColor (eserve-mark)
  ;; return the foreground color of MARK-TYPE
  (aref eserve-mark 0))
(defsubst eserve-mark-type-bgColor (eserve-mark)
  ;; return the background color of MARK-TYPE
  (aref eserve-mark 1))
(defsubst eserve-mark-type-glyphFile (eserve-mark)
  ;; return the glyph file name of MARK-TYPE
  (aref eserve-mark 2))
(defsubst eserve-mark-type-glyph (eserve-mark)
  ;; return the glyph itself of MARK-TYPE
  (aref eserve-mark 3))
(defsubst eserve-mark-type-face (eserve-mark)
  ;; return the face of MARK-TYPE
  (aref eserve-mark 4))
(defun eserve-init-mark-types (mark-type-list)
  ;; For XEmacs only, for each element of the mark-type list,
initialize the
  ;; glyph.
  (cond
    ((vectorp mark-type-list)
     (mapcar 'eserve-init-mark-type mark-type-list))
    (t t)))
(defun eserve-init-mark-type (mark-type)
  ;; Make a pixmap out of the glyphfile specified and store it
in
the glyph
  ;; object. Create a new face and set its foreground and
background
  ;; colors. Then append the mark-type to the eserve-mark-
type-list.
  ;; TBD: file checks for glyphLFile
  ;; TBD: protect against errors in making the pixmap
(incorrect format, etc.)
  (when (and (eserve-mark-type-glyphFile mark-type)
        running-xemacs)
    (aset mark-type 3 (make-pixmap (eserve-mark-type-glyphFile
mark-type)))
    (set-pixmap-contributes-to-line-height (aref mark-type 3)
nil))
  ;; if there is not an existing face and either a foreground
or background
  ;; color, then create a face and set its foreground and
background colors
  (when (and (not (eserve-mark-type face mark-type))
         (or (eserve-mark-type-fgColor mark-type)
             (eserve-mark-type-bgColor mark-type)))
    (let
      ((fgcolor (eserve-mark-type-fgColor mark-type))
       (bgColor (eserve-mark-type-bgColor mark-type))
       (face (aset mark-type 4 (copy-face 'eserve-highlight
(gensym)))))
      (when fgColor(set-face-foreground face fbColor))
      (when bgColor(set-face-background face bgColor)))))
;;
;; eserve-menu object functions
;;
;;
;; an eservemenu object has the form:
;; [eservemenu LABEL NUMITEMS ITEMS HANDLE]
;;
;; [eservemenu : symbol, identifies this vector as an
eserve-
menu
;; label : string, display in menu bar
;; numitems : integer, number of menu items in items array
;; items : array of menu items
;; handle : editor specific handle to menu
(defun eserve-menup (x)
  "returns t if x is an eservemenu"
  (and (vectorp x) (= (length x) 5) (eg (aref x 0)
'eservemenu)))
(defun eserve-menu-label (eservemenu)
  "returns the label of an eservemenu"
  (aref eservemenu 1))
(defun eserve-menu-numitems (eservemenu)
  "returns the number of menu items for an eservemenu"
```

-continued

Appendix 1

```
    (aref eservemenu 2))
(defun eserve-menu-items(eservemenu)
    "returns the array of menu items for an eservemenu"
    (aref eservemenu 3))
(defun eserve-menu-handle(eservemenu)
    "returns the editor specific handle for an eservemenu"
    (aref eservemenu 4))
(defun eserve-set-menu-label (eservemenu newlabel)
    "sets the label of an eservemenu"
    (aset eservemenu 1 newlabel))
(defun eserve-set-menu-numitems (eservemenu newnum)
    "sets the number of menu items for an eservemenu"
    (aset eservemenu 2 newnum))
(defun eserve-set-menu-items (eservemenu newitems)
    "sets the menu items for an eservemenu"
    (aset eservemenu 3 newitems))
(defun eserve-set-menu-handle (eservemenu newhandle)
    "sets the editor specific handle for and eservemenu"
    (set eservemenu 4 newhandle))
;;
;; eserve-button object functions
;;
;;
;; an eserve-button object has the form:
;; [eservebutton LABEL VERB NEEDFILEPOS HELP
SENSE_ACCELERATOR]
;;
;; 'eservebutton : symbol, identifies this vector as an
eserve-
button
;; label : string, displayed in button
;; verb : string, verb (action) sent when button is
selected
;; needfilepos : bool, if t then send file position info
with
verb
;; help        : string, documents button for user
;; accelerator    : string, key binding to invoke button
;; sense       : bool, if t, button is enabled
;; sensesym : symbol, used to store sense value
;; iconfile : string, file containing icon definition
;; offset : integer, offset in pixels from previous button
(defun eserve-buttonp (x)
    "returns t if x is an eservebutton"
    (and (vectorp x) (= (length x) 10) (eq (aref x 0)
'eservebutton)))
(defun eserve-button-label (eservebutton)
    "returns the label of an eservebutton"
    (aref eservebutton 1))
(defun eserve-button-verb (eservebutton)
    "returns the verb of an eservebutton"
    (aref eservebutton 2))
(defun eserve-button-needfilepos (eservebutton)
    "returns the needfilepos member of an eservebutton"
    (aref eservebutton 3))
(defun eserve-button-help (eservebutton)
    "returns the help member of an eservebutton"
    (aref eservebutton 4))
(defun eserve-button-accelerator (eservebutton)
    "returns the accelerator member of an eservebutton"
    (aref eservebutton 5))
(defun eserve-button-sense (eservebutton)
    "returns the sense member of an eservebutton"
    (aref eservebutton 6))
(defun eserve-button-sensesym (eservebutton)
    "returns the sensesym member of an eservebutton"
    (aref eservebutton 7))
(defun eserve-button-iconfile (eservebutton)
    "returns the iconfile member of an eservebutton"
    (aref eservebutton 8))
(defun eserve-button-offset (eservebutton)
    "returns the offset member of an eservebutton"
    (aref eservebutton 9))
(defun eserve-set-button-label (eservebutton newlabel)
    "sets the label of an eservebutton"
    (aset eservebutton 2 newverb))
(defun eserve-set-button-verb (eservebutton newverb)
```

-continued

Appendix 1

```
    "sets the verb member for an eservebutton"
    (aset eservebutton 2 newverb))
(defun eserve-set-button-needfilepos (eservebutton
newneedfilepos)
    "sets the needfilepos member an eservebutton"
    (aset eservebutton 3 newneedfilepos))
(defun eserve-set-button-help (eservebutton newhelp)
    "sets the help member an eservebutton"
    (aset eservebutton 4 newhelp))
(defun eserve-set-button-accelerator (eservebutton
newaccelerator)
    "sets the accelerator member an eservebutton"
    (aset eservebutton 5 newaccelerator))
(defun eserve-set-button-sense (eservebutton newsense)
    "sets the sense member an eservebutton"
    (aset eservebutton 6 newsense))
(defun eserve-set-button-sensesym (eservebutton newsensesym)
    "sets the sensesym member an eservebutton"
    (aset eservebutton 7 newsensesym))
(defun eserve-set-button-iconfile (eservebutton newiconfile)
    "sets the iconfile member an eservebutton"
    (aset eservebutton 7 newiconfile))
(defun eserve-set-button-offset (eservebutton newoffset)
    "sets the offset member an eservebutton"
    (aset eservebutton 7 newoffset))
;;
;; button support functions
;;
(defun eserve-button-create-cms (eservebutton name-prefix)
    "creates a command function to be invoked when the
eservebutton is selected"
    (cond
       ((and name-prefix eservebutton)
        (let ((func-name (intern (concat name-prefix
              eserve-button-label eservebutton)))))
           (eval (` (defun (, func-name) ( )
              (interactive)
              (eserve-send-verb, (, (eserve-button-verb
eservebutton))
              (, (eserve-button needfilepos
eservebutton)))))))))
(defun eserve-button-create-sensesym (eservebutton name-
prefix)
    "creates the symbol which when evaluated determines button
sense"
    (cond
       (and name-prefix eservebutton)
          (intern (concat name-prefix "-"
             (eserve-button-label eservebutton) "-
sense,,)))))
(defun eserve-register-button (button)
    "adds BUTTON to the verb button hash table"
    (let ((verb (eserve-button-verb button))
          (button-list nil))
       (cond
         (verb
            (setq button-list (cl-gethash verb eserve-verb-button-
hash))
            (cl-puthash verb (cons button button-list) eserve-verb-
button-hash)))))
(defun eserve-set-sensitivity (verb-sense)
    "sets the sensitivity of the buttons corresponding VERB-
SENSE pair"
    (let ((verb (aref verb-sense 0))
       (sense (aref verb-sense 1))
       (sense-sym nil)
       (button-list nil))
       (setq button-list (cl-gethash verb eserve-verb-button-
hash))
       (while button-list
          (set (eserve-button-sensesym (car button-list)) sense)
          (setq button-list (cdr button-list)))))
(defun eserve-set-sensitivities (verb-sense-array)
    "applies the sense values in VERB-SENSE-ARRAY to the
existing eserve buttons"
    (mapcar 'eserve-set-sensitivity verb-sense-array)
    (cond
```

-continued

Appendix 1

```
   ((and running-xemacs (not eserve-use-bb-toolbar)) ;; 19.11
      (eserve-update-frame-toolbars)
)))
;;
;; menu support functions
;;
(defun eserve-emacs-add-menus (menus)
   "adds menus from the MENUS list to the menu bar"
   (mapcar 'eserve-emacs-menu-add (reverse menus))
   (setq eserve-menus menus)
   (redraw-display))
(defun eserve-emacs-delete-menus (menus)
   "deletes menus from the MENUS list from the menu bar"
   (cond
   (menus
      (mapcar leserve-emacs-menu-delete menus)
      (setq eserve-menus nil)
      (redraw-display))))
(defun eserve-xemacs-add-menus (menus)
   "adds menus from the MENUS list to the menu bar"
   (mapcar 'eserve-xemacs-menu-add menus)
   (setq eserve-menus menus))
(defun eserve-xemacs-delete-menus (menus)
   "deletes menus from the MENUS list from the menu bar"
   (cond
   (menus
      (mapcar 'eserve-xemacs-menu-delete menus)
      (setq eserve-menus nil))))
(defun eserve-xemacs-menu-add (eservemenu)
   "adds a ESERVEMENU to the xemacs menu bar"
   (cond
   ((and eservemenu (eserve-menup eservemenu))
      (let ((handle ( ` ( (, (eserve-menu-label eservemenu) ))))
         (buttons nil)
         (menulist nil)
         (index 0)
         (max-items (eserve-menu-numitems eservemenu)))
      (eserve-set-menu-handle eservemenu handle)
      (setq button (eserve-menu-items eservemenu))
      (while (< index max-items)
      (setq menulist (append menulist
               (list (eserve-xemacs-menuitem-create
                  eservemenu (aref buttons index)))))
      (setq index (+ index 1)))
      (add-menu nil (eserve-menu-label eservemenu)
menulist)))))
(defun eserve-xemacs-menuitem-create (eservemenu eservebutton)
   "returns an xemacs menuitem from ESERVEBUTTON"
   (let ((menuitem (make-vector 4 nil)))
   (aset menuitem 0 (eserve-button-label eservebutton))
   (aset menuitem 1 (eserve-button-create-cmd eservebutton
(eserve-menu-label eservemenu)))
   (eserve-set-button-sensesym eservebutton
      (eserve-button-create-sensesym eservebutton (eserve-menu-
label eservemenu)))
   (set (eserve-button-sensesym eservebutton)
      (eserve-button-sense eservebutton))
   (aset menuitem 2 (eserve-button-sensesym eservebutton))
   (eserve-register-button eservebutton)
menuitem))
(defun eserve-xemacs-menu-delete (eservemenu)
   "delete a ESERVEMENU from the xemacs menu bar"
   (cond
   ((and eservemenu (eserve-menup eservemenu))
   (delete-menu-items (eserve-menu-handle eservemenu)))))
(defun eserve-emacs-menu-add (eservemenu)
   "adds a ESERVEMENU to the menu bar"
   (cond
   ((and eservemenu (eserve-menup eservemenu))
      (let ((handle ( ` [menu-bar (, (intern (eserve-menu-label
eservemenu))) ]))
         (kmap (make-sparse-keymap (eserve-menu-label
eservemenu)))
         (index (eserve-menu-numitems eservemenu))
         (button-cmd nil)
         button))
      (define-key global-map handle (cons (eserve-menu-label
```

-continued

Appendix 1

```
eservemenu) kmap))
      (eserve-set-menu-handle eservemenu handle)
      (while (> index 0)
    (setq button (aref (eserve-menu-items eservemenu (-
index 1)))
      (setq button-cmd (eserve-button-create-cmd button
(eserve-menu-label eservemenu)))
      (define-key kmap ( ` ] (, (intern (eserve-button-label
button))) ])
        (1 ( (, (eserve-button-label button))
              (, (eserve-button-help button)).
              (, button-cmd))))
    (eserve-set-button-sensesym button
    (eserve-button-create-sensesym button (eserve-menu-
label eservemenu)))
    (set (eserve-button-sensesym button) (eserve-button-
sense button))
    (put button-cmd menu-enable (eserve-button-sensesym
button))
    (eserve-register-button button)
    (setq index (- index 1)))
      (setg menu-bar-final-items (append
                  (list (intern (eserve-menu-label
eservemenu)))
                  menu-bar-final-items))))))
(defun eserve-emacs-menu-delete (eservemenu)
  "delete a ESERVEMENU from the emacs menu bar"
  (cond
  ((and eservemenu (eserve-menup eservemenu))
    (global-unset-key (eserve-menu-handle eservemenu))
    (setq menu-bar-final-items
      (delete (intern (eserve-menu-label eservemenu))
        menu-bar-final-items)))))
;;
;; version control support
;;
(defun eserve-emacs-vc-setup ( )
  "sets up the VC menu for GNU emacs"
  (require 'vc)
  (cond
  ((not (or (keymapp (lookup-key global-map [menu-bar vc]))
      (keymapp (lookup-key global-map [menu-bar VC]))))
  (setq eserve-vc-teardown-menu t)
  (defvar eserve-vc-menu (make-sparse-keymap "eserve-vc"))
  (define-key global-map (menu-bar vc] (cons "VC" eserve-vc-
menu))
    (defind-key eserve-vc-menu [eserve-vc-list-reg-files]
      (cons "List Registered Files" 'eserve-vc-directory4))
    (defind-key eserve-vc-menu [eserve-vc-list-any-locked-files]
      (cons "List Locked Files Any User" 'vc-directory))
    (defind-key eserve-vc-menu [eserve-vc-list-locked-files)
      (cons "List Locked Files" leserve-vc-directory16))
    (defind-key eserve-vc-menu [eserve-vc-print-log)
      (cons "Show Edit History" 'vc-print-log))
    (defind-key eserve-vc-menu [separator2]
      ' ("- - - " . nil))
    (defind-key eserve-vc-menu [eserve-vc-revert-buffer]
      (cons "Revert File" 'vc-revert-buffer))
    (setq eserve-vc-next-op-item (define-key eserve-vc-menu
[eserve-vc-next-action]
          (cons "NEXT-OPERATION" 'vc-next-action)))
    (put 'vc-revert-buffer menu-enable 'vc-mode)
    (put 'vc-diff 'menu-enable 'vc-mode)
    (put 'vc-print-log 'menu-enable 'vc-mode)
    (put 'vc-next-action menu-enable '(eserve-vc-menu-
sensitize))
    (setq menu-bar-final-items (append '(vc) menu-bar-final-
items)))))
(defun eserve-emacs-vc-cleanup ( )
  "tears down the VC menu for GNU emacs"
  (cond
    (eserve-vc-teardown-menu
    (global-unset-key [menu-bar vc])
    (setq eserve-vc-teardown-menu nil))))
(defun eserve-vc-directory16 ( )
  (interactive)
  (vc-directory '(16)))
```

-continued

Appendix 1

```
(defun eserve-vc-directory4 ( )
   (interactive)
   (vc-directory '(4)))
(defun eserve-vc-menu-sensitize ( )
   (let ((file (if buffer-file-name
            (file-name-nondirectory buffer-file-name)
            (buffer-name)))
         (owner nil))
      (setcar eserve-vc-next-op-item
            (cond ((not vc-mode)
               "Register File")
            ((not (setq owner (vc-locking-user file)))
               "Check out File")
            ((not (string-equal owner (user-login-name)))
               "Steal File Lock")
            (t "Check in File - -)))))
(defun eserve-xemacs-vc-setup ( )
   "sets up the VC menu for XEmacs"
   (require 'vc)
   (cond
   ((and (not (assoc "VC" current-menubar))
         (boundp 'vc-default-menu))
      (setq eserve-vc-teardown-menu t)
      (add-menu ( ) "VC" vc-default-menu))))
(defun eserve-xemacs-vc-cleanup ( )
   "tear down the VC menu for XEmacs"
   (cond
      (eserve-vc-teardown-menu
      ;; for now do nothing
      (setq eserve-vc-teardown-menu nil))))
;;
;; file/buffer utility functions
;;
(defun eserve-file-to-buffer (file-name)
   "Returns the buffer containing the contents of FILENAME or
nil\n\
if no such buffer exists."
   (get-file-buffer (expand-file-name (abbreviate-file-name
file-name))))
(defun eserve-file-to-buffer-create (file-name)
   "returns the buffer containing the content of FILENAME
(creates the buffer if not found)"
   (let ((full-file-name (abbreviate-file-name file-name))
         (file-buff nil))
      (setg file-buff (get-file-buffer full-file-name))
      (cond
         (file-buff file-buff)
         (t (find-file-noselect full-file-name)))))
(defun eserve-line-to-pos (file-buffer line-no)
   "returns the character position of LINENO in BUFFER"
      (save-excursion
         (set-buffer file-buffer)
         (goto-char 1)
         (goto-line line-no)
         (point)))
(defun eserve-cursor-line ( )
   (save-excursion
      (progn (beginning-of-line) (count-lines 1 (point)))))
(defun eserve-cursor-column ( )
   (current-column))
(defun eserve-current-selection
   "return the text of the current selection"
   (save-excursion
   (let ((sel-text nil)
      (sel-exists (x-selection-exists-p 'PRIMARY))
      (own-text (x-selection-owner-p))
      (message-string nil))
   (cond
   ((and sel-exists own-text)
      (setq sel-text (x-get-selection-internal 'PRIMARY
'STRING)))
         (t
         nil)))))
(defun eserve-show-buffer (file-buffer)
   "switches current window to FILEBUFFER"
      (cond
      (file-buffer
```

-continued

Appendix 1

```
      (switch-to-buffer file-buffer))))
(defun eserve-raise-buffer (file-buffer)
   "raises the X window containing FILEBUFFER"
   (cond
     (file-buffer
     (raise-frame (window-frame (get-buffer-window file-
buffer))))))
(defun eserve-add-to-path (dir)
   "adds DIR to the emacs LOAD-PATH"
   (cond
     (add dir
        (stringp dir)
        (not (member dir load-path)))
     (setq load-path
        (append (list (expand-file-name dir)) load-path)))))
;;
;; hook functions for editor events
;;
(defun eserve-find-file-hook ( )
   "notifies client that new file has been loaded into emacs"
   (let ((file-name (buffer-file-name nil))
      (file-buffer nil))
   (cond
   (file-name
      (setq file-buffer (eserve-file-to-buffer file-name))
      (cond
        (file-buffer
        (eserve-event-loaded-file file-name)))))))
(defun eserve-first-change-hook ( )
   "notifies client that file has been modified by_emacs"
   (let ((file-name (buffer-file-name nil)))
      (cond
      (file-name
         (eserve-event-modified-file file-name)))))
(defun eserve-after-save-hook ( )
   "notifies client that new file has been saved by emacs"
   (let ((file-name (buffer-file-name nil)))
      (cond
        (file-name
           (eserve-event-saved-file file-name)))))
(defun eserve-kill-buffer-hook ( )
   "deletes buffer from eserve lists and informs eserve of
event"
   (cond
      (buffer-file-name
         (line ((delete-buffer (get-file-buffer buffer-file-name)))
           (eserve-log-text (format "eserve-kill-buffer hook -
buffer
name %s\n" buffer-file-name))
           (if (not deleted-buffer)
           (eserve-log-text "eserve-kill-buffer hook -no deleted
buffer\n"))
         (cond
           (deleted-buffer
           (eserve-event-deleted-file buffer-file-name)
              (cond
                 ((eserve-get-buffer-marks deleted-buffer)
                    (eserve-delete-buffer-marks deleted-buffer)))))))
         (t
         (eserve-log-text "eserve-kill-buffer hook - no buffer
name\n"))))
;;
;; event functions - used to inform eserve of events
occurring
;; in emacs
;;
(defun eserve-event-deleted-file (deleted-file-name)
   "informs eserve that DELETEDFILENAME has been deleted"
   (let ((event-string (concat "deletedFile" deleted-file-name
"\n")))
   (eserve-process-send-string eserve-connection event-string)
   (eserve-log-text (format "(%s\n" event-string))))
(defun eserve-event-loaded-file (loaded-file-name)
   "informs eserve that LOADEDFILE.NAME has been loaded"
   (let ((event-string (concat "loadedfile" loaded-file-name"
\n')))
      (eserve-process-send-string eserve-connection event-
```

-continued

Appendix 1

```
string)
      (eserve-log-text (format "(%s)\n" event-string))))
(defun eserve-event-modified-file (modified-file-name)
   "informs eserve that MODIFIEDFILENAME has been modified"
   (let ((event-string (concat "modifiedFile " modified-file-
name
"\n")))
      (eserve-process-send-string eserve-connection event-
string)
      (eserve-log-text (format "(%s)\n" event-string))))
(defun eserve-event-saved-file (saved-file-name)
   "informs eserve that SAVEDFILENAME has been loaded"
   (let ((event-string (concat "savedfile " saved-file-name
"\n")))
      (eserve-process-send-string eserve-connection event-
string)
      (eserve-log-text (format "(%s)\n" event-string))))
(defun eserve-editor-version ( )
   "returns a string containing the major/minor version number"
   (let ((version-end (string-match " " emacs-version))
      (editor-version emacs-version))
     (cond
       (version-end
          (setq editor-version (substring emacs-version 0
                    version-end))))
         editor-version))
(defun eserve-event-connected ( )
   "informs eserve that it is connected to emacs"
   (let ((event-string nil))
      (cond
       (running-xemacs
          (setq event-string (format "connected xemacs %d %s\n"
                    eserve-protocol-version
                    (eserve-editor-version))))
       (t
          (setq event-string (format "connected emacs %d %s\n"
                    eserve-protocol-version
                    (eserve-editor-version)))))
      (eserve-process-send-string eserve-connection event-string)
      (eserve-log-text (format "(%s)\n" event-string))))
;;
;; eserve function key binding registration/invocation
functions
;;
(defun eserve-add-fkey-function (funcname)
   "registers fkey-binding function named by the atom FUNCNAME
to be called at connect time"
   (cond
    ((and funcname (symbolp funcname)
       (fboundp funcname))
     (setq eserve-fkey-functions (append eserve-fkey-functions
                    (list (symbol-function
funcname)))))))
(defun eserve-init-fkey-functions ( )
   "calls all the registered function key binding_functions"
   (mapcar 'funcall eserve-fkey-functions))
;;; Toolbar (aka buttonbar) functions
;;;
(defun eserve-set-bb-tb-table (toolbar-table) ;; 19.11
   "Sets eserve-toolbar-table to TOOLBAR_TABLE, performs all
needed
   initializations and displays the toolbar. [Returns TBD if
successful, or TBD
   if a non-fatal error is raised. Signals the error TBD
otherwise.]"
)
(defun eserve-toggle-frame-toolbar (frame)
   "toggles TOOLBAR for FRAME"
   (cond
    ((equal eserve-current-toolbar
         (specifier-instance top-toolbar frame))
     (eserve-deinstall-frame-toolbar frame))
    (t
     (eserve-install-frame-toolbar frame eserve-current-
toolbar))))
(defun eserve-install-frame-toolbar (frame toolbar)
   "saves current toolbar info for FRAME and puts up TOOLBAR on
```

-continued

Appendix 1

```
FRAME"
    (eserve-save-frame-toolbar frame)
    (eserve-set-frame-toolbar frame toolbar))
(defun eserve-deinstall-frame-toolbar (frame)
    "takes down current toolbar on FRAME and puts up previous
toolbar"
    (let ((toolbar-info (assoc frame eserve-frame-previous-
toolbar-alist)))
        (cond
        (toolbar-info
            (eserve-restore-frame-toolbar toolbar-info)))))
(defun eserve-set-frame-toolbar (frame toolbar)
    "put TOOLBAR up on FRAME"
;; (add-spec-to-specifier top-toolbar-height frame eserve-
toolbar-icon-height)
    (add-spec-to-specifier top-toolbar toolbar frame))
(defun eserve-save-frame-toolbar (frame)
    "save current toolbar infor for FRAME so we can restore it
later"
    (let ((toolbar-info (assoc frame eserve-frame-previous-
toolbar-alist)))
        (cond
            (toolbar-info
                (setcdr toolbar-info (list (specifier-instance top-
toolbar-height frame))))
            (t
                (setq eserve-frame-previous-toolbar-alist
                    (append
                        (list (list frame (specifier-instance top-toolbar-
height (selected-frame))))
                        eserve-frame-previous-toolbar-alist))))))
(defun eserve-restore-frame-toolbar (toolbar-info)
    "restore information from TOOLBAR-INFO"
    (let ((frame (nth 0 toolbar-info))
        (toolbar-height (nth 1 toolbar-info)))
        (cond
        ((frame-live-p frame)
        (remove-specifier top-toolbar frame)
;;      (add-spec-to-specifier top-toolbar-height toolbar-
height frame)
        ))
        (setq eserve-frame-previous-toolbar-alist
            (delq toolbar-info eserve-frame-previous-toolbar-
alist))))
(defun eserve-update-frame-toolbars ( )
    "update all eserve frame toolbars"
    (mapcar '(lambda (tb-info)
                (add-spec-to-specifier
                top-toolbar eserve-current-toolbar (nth 0 tb-
info)))
            eserve-frame-previous-toolbar-alist))
(defun eserve-set-toolbar-table (toolbar-table)
    "Sets eserve-toolbar-table to TOOLBAR-TABLE, performs all
needed
    initializations and displays the toolbar. [Returns TBD if
successful, or TBD
    if a non-fatal error is raised. Signals the error TBD
otherwise.]"
        (cond
            (running-xemacs
                (let ((old-tb-bg-attr (assoc "BgColor" xpm-color-
symbols))
                    (new-tb-bg-color nil)
                    (new-tb-bg-attr nil))
                (message "Initializing toolbar . . . ")
                ;; toolbar checks
                (when (not (vectorp toolbar-table))
                    (signal 'wrong-type-arg '(toolbar-table)))
                ;; temporary variable
                (setq eserve-use-bb-toolbar nil) ;; 19.11
                ;; substitute toolbar background for icon bg color
                (setq new-tb-bg-color (cdr (aseq 'background-toolbar-
color
                                    (frame-parameters (selected-
frame)))))
            (cond
            ((not new-tb-bg-color)
```

Appendix 1

―continued

```
              (setq new-tb-bg-color (face-background 'default))))
       (setq xpm-color-symbols (delete old-tb-bg-attr xpm-
color-symbols))
       (setq xpm-color-symbols
               (append
                (list
                 (' ("BgColor" (, new-tb-bg-color))))
                xpm-color-symbols))
     ;; create and install toolbar
          (when (not eserve-current-toolbar)
               (eserve-init-toolbar toolbar-table))
          (eserve-install-frame-toolbar (selected-frame) eserve-
current-toolbar
        ;; substitute previous/saved bg color for icon bg
color
         (setq new-tb-bg-attr (assoc "BgColor" xpm-color-
symbols))
         (setq xpm-color-symbols (delq new-tb-bg-attr xpm-
color-symbols))
         (setq xpm-color-symbols (append (list old-tb-bg-attr)
                        xpm-color-symbols))
         (message " ")))))
(defun eserve-init-toolbar (toolbar-table)
   (setq eserve-toolbar-table toolbar-table) ; Save toolbar-
table
   (setq eserve-current-toolbar nil)     ;delete any previous
toolbars
   (mapcar 'eserve-init-toolbar-item toolbar-table))
(defun eserve-init-toolbar-item (toolbar-item)
   (let ((verb    (eserve-button-verb toolbar-item))
      (filepos (eserve-button-needfilepos toolbar-item))
      (button-cmd (eserve-button-create-cmd toolbar-item
"eserve-toolbar"))
      (button-sense (eserve-button-sense toolbar-item))
      (button-sensesym (eserve-button-create-sensesym toolbar-
item "eserve-toolbar"))
      (button-space (eserve-button-offset toolbar-item))
      (spacer nil))
     (set button-sensesym button-sense)
     (eserve-set-button-sensesym toolbar-item button-sensesym)
     (eserve-register-button toolbar-item)
     (cond
      ((and (integerp button-space) (> button-space 0))
       (setq spacer (list (vector :size button-space ':style
'2d)))))
     (setq eserve-current-toolbar
       (append
        eserve-current-toolbar
        spacer
        (list
          (vector
           (list
            (make-pixmap (eserve-button-iconfile toolbar-
item)))
         button-cmd
         button-sensesym
         (eserve-button-help toolbar-item)))
))))
;;;
;;; XEmacs-specific functions
;;;
(defun eserve-xemacs-create-extent (mark-type start end)
   ;; Create an extent in the current buffer with the
properties of
MARK-TYPE
   ;; and return it. The function 'eserve-create-overlay-or-
extent'
is aliased
   ;; to this one when running XEmacs. Note, the arguments
START
and END are
   ;; not used and are present only because the corresponding
function in GNU
   ;; Emacs 'eserve-emacs-create-overlay' needs them.
   (when (or (eserve-mark-type-fgColor mark-type)
         (eserve-mark-type-bgColor mark-type)
         (eserve-mark-type-face   mark-type))
```

-continued

Appendix 1

```
    (let
            ((pixmap (eserve-mark-type-glyph mark-type))
            (face (eserve-mark-type-face mark-type))
            (extent (make-extent start end (current-buffer)))) ;no
location!
        (if face
            (set-extent-face extent face)
            (set-extent-face extent 'eserve-highlight))
        (when pixmap
            (set-extent-begin-glyph extent pixmap 'outside-margin)
            (set-buffer-left-margin-width 3))
        ;; after-change-function, is buffer local
        (setq after-change-function 'eserve-xemacs-change-
function)
;TBD: Replace
        extent)))
extent)))                    ;return the newly
created
extent
(defun eserve-xemacs-change-function (start end old-length)
    ;; Called by 'after-change-function' to see if a newline was
inserted and
    ;; if so, to terminate d the extent before that point. TBD:
the
    ;; corresponding operation of gluing two lines together to
form a
single
    ;; highlighted line.
    (save-excursion
        (goto-char start)
        (when (and (re-search-forward "\n" end t) ;return nil on
failure
                        (<= (point) end)
            (let
                ((extent (extent-at (point)))) ;returns smallest
extent
            (if extent (set-extent-endpoints extent (extent-start-
position extent)
                            (point))))))))
(defun eserve-xemacs-delete-extent (extent)
    (when extent
        (delete-extent extent)
        (setq after-change-function nil)))
;;;
;;; GNU Emacs-specific functions
;;;
(defun eserve-emacs-create-overlay (mark-type start end)
    ;; Create an overlay with the properties specified by MARK
TYPE
and return
    ;; it. The function 'eserve-create-overlay-or-extent' is
aliased
to this one
    ;; when running GNU Emacs v19. N.B. There are no pixmaps
(i.e.
true
    ;; glyphs) in GNU Emacs v19. TBD: replace use of gensym.
    (let
        ((overlay (make-overlay start end))
            (face (eserve-mark-type-face mark-type)))
        (cond
        (face
        (overlay-put overlay 'face (face-name face))
        (overlay-put overlay 'modification-hooks
                (list 'eserve-emacs-modification-function))
        overlay))))
(defun eserve-emacs-delete-overlay (overlay)
    (when overlay
        (delete-overlay overlay)))
(defun eserve-emacs-modification-function (overlay start end)
    ;; Called by the modification hook in the overlay to see if
a
newline was
    ;; inserted and if so, to terminate the extent before that
point.
TBD.
    ;; the corresponding operation of gluing two lines together
```

-continued

Appendix 1

```
to
form a
  ;; single highlighted line.
  (save-excursion
    (if (string-match"
" (this-command-keys))
        (move-overlay overlay (overlay-start overlay)
(point)))))
(provide reserve) :Announce that we're providing the package
'eserve'.
;; Copyright (C) 09 Jun 1995 Sun Microsystems, Inc.
```

What is claimed as new and is desired to be secured by Letters Patent of the United States is:

1. An apparatus for relating a stack entry message with information relevant to the stack entry message, the apparatus comprising:
    a filter for generating link information comprising at least one location of information relevant to a first portion of the stack entry message, the link information including linked text or links to corresponding program instructions corresponding to the stack entry message;
    a links manager coupled to the filter for displaying a stack entry and accepting input from a user to indicate a second portion of the stack entry message; and
    a control manager for directing operation of a program responsive to an indication of the second portion of the stack entry.

2. The apparatus of claim 1 wherein the filter is additionally for dividing at least one of the stack entry messages into at least one third portion.

3. The apparatus of claim 2 wherein the filter is additionally for associating at least one fourth portion of the stack entry message with at least a portion of the link generated information.

4. The apparatus of claim 1 wherein the links manager is additionally for highlighting at least one fifth portion of at least one stack entry message.

5. The apparatus of claim 4 wherein the links manager is additionally for identifying a position of at least one sixth portion of at least one stack entry message, and relating the user input to at least one identified position.

6. The apparatus of claim 1 wherein at least one stack entry message is a variable identifier, and the links manager is additionally for relating the variable identifier to initialization information of the variable identifier.

* * * * *